(12) United States Patent
Zhang et al.

(10) Patent No.: US 11,102,817 B2
(45) Date of Patent: Aug. 24, 2021

(54) SYSTEM AND METHOD FOR SUPPORTING BURSTY COMMUNICATIONS IN WIRELESS COMMUNICATIONS SYSTEMS

(71) Applicant: Huawei Technologies Co., Ltd., Shenzhen (CN)

(72) Inventors: Jiayin Zhang, Shanghai (CN); Mohamed Adel Salem, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/534,931

(22) Filed: Aug. 7, 2019

(65) Prior Publication Data

US 2020/0053782 A1    Feb. 13, 2020

Related U.S. Application Data

(60) Provisional application No. 62/716,869, filed on Aug. 9, 2018.

(51) Int. Cl.
| | | |
|---|---|---|
| *H04W 74/08* | (2009.01) | |
| *H04W 72/12* | (2009.01) | |
| *H04W 72/04* | (2009.01) | |
| *H04W 74/00* | (2009.01) | |
| *H04L 27/00* | (2006.01) | |

(52) U.S. Cl.
CPC ..... *H04W 74/0816* (2013.01); *H04L 27/0006* (2013.01); *H04W 72/0446* (2013.01); *H04W 72/1205* (2013.01); *H04W 74/002* (2013.01)

(58) Field of Classification Search
CPC ......... H04W 74/0816; H04W 72/1205; H04W 72/0446; H04W 74/002; H04W 74/0808; H04L 27/0006; H04L 5/0091; H04L 5/0053; H04L 5/0051
See application file for complete search history.

(56) References Cited

U.S. PATENT DOCUMENTS

| | | |
|---|---|---|
| 2016/0227425 A1 | 8/2016 | Kim et al. |
| 2017/0142743 A1 | 5/2017 | Yoon et al. |
| | (Continued) | |

FOREIGN PATENT DOCUMENTS

| | | |
|---|---|---|
| CN | 105636221 A | 6/2016 |
| CN | 106465411 A | 2/2017 |
| CN | 107889114 A | 4/2018 |

OTHER PUBLICATIONS

3rd Generation Partnership Project; Technical Specification Group Access Network; NR; Physical Channels and modulation (Release 15), 3GPP TS 38.211, V15.3.0, 93 Pages, Sep. 2018.
(Continued)

*Primary Examiner* — Yaotang Wang
(74) *Attorney, Agent, or Firm* — Slater Matsil, LLP

(57) ABSTRACT

A computer implemented method for operating an access node includes: generating, by the access node, an initial block and a time-dependent signal for transmission in a channel occupancy time (COT) of a shared communications channel, the initial block including a time-independent initial sequence that enables the initial block to be transmitted over any slot in the COT, wherein the time-dependent signal is transmitted after the initial block; and transmitting, by the access node, the initial block and the time-dependent signal in a first slot of the COT. An access node is also described.

43 Claims, 11 Drawing Sheets

(56) References Cited

U.S. PATENT DOCUMENTS

2019/0349815 A1* 11/2019 Tiirola .................. H04W 28/26
2020/0045696 A1*  2/2020 Huang .................. H04L 5/0094
2020/0229231 A1*  7/2020 Oh ........................ H04W 80/08
2020/0337072 A1* 10/2020 Lunttila ................ H04L 5/0094

OTHER PUBLICATIONS

LG Electronics, "Physical layer design of DL signals and channels for NR unlicensed operation", 3GPP TSG RAN WG1 Meeting #93, May 21-25, 2018, 4 Pages, R1-1806643, Busan, Korea.
Qualcomm Incorporated, "DL signals and channels for NR-U", 3GPP TSG RAN WG1 Meeting #93, May 21-May 25, 2018, 10 Pages, R1-1807387, Busan, Korea.
Huawei et al., "Initial access in NR unlicensed", 3GPP TSG RAN WG1 Meeting #94, R1-1808062, Aug. 20-Aug. 24, 2018, 6 Pages, Gothenburg, Sweden.

* cited by examiner

CARRIER AGGREGATION

CHANNEL BONDING/
SINGLE WIDEBAND CARRIER

LBT FAILURE

SYSTEM AND METHOD FOR SUPPORTING BURSTY COMMUNICATIONS IN WIRELESS COMMUNICATIONS SYSTEMS

CROSS REFERENCE

This application claims priority to U.S. Provisional Patent Application Ser. No. 62/716,869, filed Aug. 9, 2018, entitled "System and Method for Supporting Bursty Communications in Wireless Communications Systems", the contents of which are incorporated by reference herein in their entirety.

TECHNICAL FIELD

The present disclosure relates generally to a system and method for wireless communications, and, in particular embodiments, to a system and method for supporting bursty communications in wireless communications systems.

BACKGROUND

Developers of future wireless communications systems are looking in a wide variety of areas in order to provide increased data rates to meet the ever increasing demands of users. One such area involves communications in unlicensed radio spectrum to increase available bandwidth. However, operating in some portions of the unlicensed radio spectrum may have a regulatory requirement for the interference that the communicating devices may cause to other communicating devices, as well as being able to tolerate interference from other communicating devices.

As an example, operation on some portions of unlicensed radio spectrum in Europe requires that a transmitting device perform listen before talk (LBT) before it makes a transmission. In LBT, the transmitting device has to listen to the communications channel (or channels) to ascertain that the communications channel is idle before it can transmit. If the communications channel is not idle, the transmitting device cannot transmit. The uncertainty related to the availability of the communications channel may present a problem for communications systems with scheduled communications because the communications generally have to be scheduled and at least partially generated before the transmitting device is able to determine if the communications channel is available. Therefore, if the communications channel is unavailable, at least some of the scheduled communications cannot take place and the communications that has been generated is wasted. Therefore, there is a need for systems and methods for ensuring fair and efficient usage of the unlicensed spectrum.

SUMMARY

Example embodiments provide a system and method for supporting bursty communications in wireless communications systems.

In accordance with an example embodiment, a computer-implemented method for operating an access node comprises: generating, by the access node, an initial block and a time-dependent signal for transmission in a channel occupancy time (COT) of a shared communications channel, the initial block including a time-independent initial sequence that enables the initial block to be transmitted over any slot in the COT, wherein the time-dependent signal is transmitted after the initial block; and transmitting, by the access node, the initial block and the time-dependent signal in a first slot of the COT.

Optionally, in any of the preceding embodiments, the time-independent initial sequence comprises a demodulation reference signal (DMRS) for control information.

Optionally, in any of the preceding embodiments, the DMRS for control information is transmitted over a physical broadcast channel (PBCH).

Optionally, in any of the preceding embodiments, the DMRS for control information is transmitted over a physical downlink control channel (PDCCH) having a structure of control resource set (CORESET).

Optionally, in any of the preceding embodiments, the DMRS for control information is a DMRS for one or more physical downlink control channels (PDCCHs) in the CORESET at a beginning of the COT.

Optionally, in any of the preceding embodiments, the one or more PDCCHs are group common (GC)-PDCCH in a common search space at a beginning of the COT.

Optionally, in any of the preceding embodiments, the GC-PDCCH carries a COT structure indication in one or more of a time domain and a frequency domain.

Optionally, in any of the preceding embodiments, the initial block is transmitted at the beginning of each of a plurality of downlink (DL) bursts within the COT.

Optionally, in any of the preceding embodiments, the initial block identifies the slot within which it is transmitted as a reference slot.

Optionally, in any of the preceding embodiments, the time-dependent signal is time-dependent relative to a time of the reference slot.

Optionally, in any of the preceding embodiments, the initial block further comprises control information configuring the COT.

Optionally, in any of the preceding embodiments, the control information comprises at least one of an indicator of a duration of the COT, or an indicator of a composition of the COT.

Optionally, in any of the preceding embodiments, the indicator of the composition of the COT comprises a transmission type for each slot of the COT.

Optionally, in any of the preceding embodiments, a relative slot index of the slot where the initial block located is carried in the control information field of the initial block.

Optionally, in any of the preceding embodiments, the method further comprises

Optionally, in any of the preceding embodiments, adjusting, by the access node, the relative slot index of the slot with a slot offset associated with the COT.

Optionally, in any of the preceding embodiments, the shared communications channel comprises a plurality of listen before talk (LBT) subbands, and wherein at least one initial block is transmitted in a subset of LBT subbands of the plurality of LBT subbands.

Optionally, in any of the preceding embodiments, transmitting the initial block comprises transmitting the at least one initial block over each subband of the plurality of subbands in which an LBT process is successfully performed.

Optionally, in any of the preceding embodiments, different initial blocks are transmitted over each carrier of a subset of carriers during a common slot.

Optionally, in any of the preceding embodiments, the same initial block is transmitted over each carrier of a subset of carriers during a common slot.

Optionally, in any of the preceding embodiments, the method further comprises: generating, by the access node, a second initial block comprising a time-dependent initial sequence and control information configuring the COT; and transmitting the second initial block in at least one second slot of the COT, the at least one second slot of the COT being later than the first slot of the COT.

Optionally, in any of the preceding embodiments, the time-independent initial sequence of the initial block comprises a plurality of duplicates of a PBCH DMRS.

Optionally, in any of the preceding embodiments, the method further comprises transmitting, by the access node, a transmission in a slot during a downlink portion of the COT, the transmission being scrambled in accordance with a relative slot index of the slot.

In accordance with an example embodiment, an access node for use in a wireless network comprises: a transmitter; a processor; and a non-transitory computer-readable medium containing instructions which, when executed by the processor, cause the access node to: generate an initial block and a time-dependent signal for transmission in a channel occupancy time (COT) of a shared communications channel, the initial block including a time-independent initial sequence that enables the initial block to be transmitted over any slot in the COT, wherein the time-dependent signal is transmitted after the initial block; and transmit the initial block and the time-dependent signal in a first slot of the COT.

Optionally, in any of the preceding embodiments, the time-independent initial sequence comprises a demodulation reference signal (DMRS) for control information.

Optionally, in any of the preceding embodiments, the DMRS for control information is transmitted over a physical broadcast channel (PBCH).

Optionally, in any of the preceding embodiments, the DMRS for control information is transmitted over a physical downlink control channel (PDCCH) having a structure of control resource set (CORESET).

Optionally, in any of the preceding embodiments, the DMRS for control information is a DMRS for one or more physical downlink control channels (PDCCHs) in the CORESET at a beginning of the COT.

Optionally, in any of the preceding embodiments, the one or more PDCCHs are group common (GC)-PDCCH in a common search space at a beginning of the COT.

Optionally, in any of the preceding embodiments, the GC-PDCCH carries a COT structure indication in one or more of a time domain and a frequency domain.

Optionally, in any of the preceding embodiments, the initial block is transmitted at the beginning of each of a plurality of downlink (DL) bursts within the COT.

Optionally, in any of the preceding embodiments, the initial block identifies the slot within which it is transmitted as a reference slot.

Optionally, in any of the preceding embodiments, the time-dependent signal is time-dependent relative to a time of the reference slot.

Optionally, in any of the preceding embodiments, the initial block further comprises control information configuring the COT.

Optionally, in any of the preceding embodiments, the control information comprises at least one of an indicator of a duration of the COT, or an indicator of a composition of the COT.

Optionally, in any of the preceding embodiments, the indicator of the composition of the COT comprises a transmission type for each slot of the COT.

Optionally, in any of the preceding embodiments, a relative slot index of the slot where the initial block located is carried in the control information field of the initial block.

Optionally, in any of the preceding embodiments, the instructions further cause the access node to adjust the relative slot index of the slot with a slot offset associated with the COT.

Optionally, in any of the preceding embodiments, the shared communications channel comprises a plurality of listen before talk (LBT) subbands, and wherein at least one initial block is transmitted in a subset of LBT subbands of the plurality of LBT subbands.

Optionally, in any of the preceding embodiments, the instructions cause the access node to transmit the initial block including instructions that cause the access node to transmit the at least one initial block over each subband of the plurality of subbands in which an LBT process is successfully performed.

Optionally, in any of the preceding embodiments, different initial blocks are transmitted over each carrier of a subset of carriers during a common slot.

Optionally, in any of the preceding embodiments, the same initial block is transmitted over each carrier of a subset of carriers during a common slot.

Optionally, in any of the preceding embodiments, the instructions further cause the access node to: generate a second initial block comprising a time-dependent initial sequence and control information configuring the COT; and transmit the second initial block in at least one second slot of the COT, the at least one second slot of the COT being later than the first slot of the COT.

Optionally, in any of the preceding embodiments, the time-independent initial sequence of the initial block comprises a plurality of duplicates of a PBCH DMRS.

Optionally, in any of the preceding embodiments, the instructions further cause the access node to transmit a transmission in a slot during a downlink portion of the COT, the transmission being scrambled in accordance with a relative slot index of the slot.

Practice of the foregoing embodiments enables a reduction in wasted overhead arising from the determination that the communications channel is unavailable because the communications is scheduled referenced to a relative index, therefore, the communications that have been scheduled do not need to be discarded should the communications channel be unavailable. Instead, the scheduled communications may simply be referenced to a different relative index once the communications channel becomes available.

Practice of the foregoing embodiments also helps to improve interference whitening performance by generating concurrent communications with differing relative slot indices when different cells of a single transmit-receive point are transmitting.

BRIEF DESCRIPTION OF THE DRAWINGS

For a more complete understanding of the present disclosure, and the advantages thereof, reference is now made to the following description taken in conjunction with the accompanying drawings, in which.

DETAILED DESCRIPTION OF ILLUSTRATIVE EMBODIMENTS

The making and using of the disclosed embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
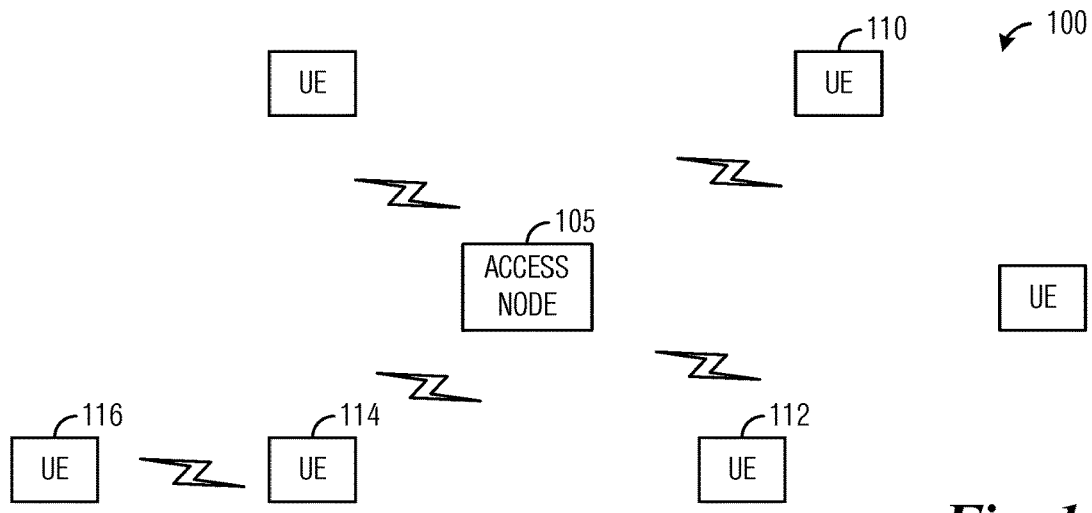
FIG. 1 illustrates an example wireless communications system according to example embodiments described herein.

FIG. 1 illustrates an example wireless communications system 100. Communications system 100 includes an access node 105 serving a plurality of user equipments (UEs), including UEs 110, 112, 114, and 116. Access node 105 establishes downlink and uplink connections with the UEs. The downlink connections carry data from access node 105 to the UEs and the uplink connections carry data from the UEs to access node 105. Data carried over the downlink or uplink connections may include data communicated between the UEs and services (not shown) by way of a backhaul network. Wireless access may be provided in accordance with one or more wireless communications protocols, e.g., the Third Generation Partnership Project (3GPP) Long Term Evolution (LTE), LTE Advanced (LTE-A), Fifth Generation (5G) New Radio (NR), high speed packet access (HSPA), IEEE 802.11, and so on. Although it is understood that communications systems may employ multiple access nodes capable of communicating with any number of UEs, only one access node and six UEs are illustrated for simplicity.

In a first operating mode, communications to and from the plurality of UEs go through access node 105. In second communications mode, direct communication between UEs is possible. An example of the second communications mode is the proximity services (ProSe) operating mode standardized in 3GPP. Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on. UEs may also be commonly referred to as mobile stations, mobiles, terminals, stations, and the like. Access nodes may provide wireless access in accordance with one or more wireless communication protocols, e.g., LTE, LTE-A, 3GPP NR, HSPA, Wi-Fi 802.11a/b/g/n/ac, etc.

Communications taking place in communications system 100 may occur over licensed spectrum, which is radio spectrum that is purchased from or licensed by a regulatory body, granting the purchaser or licensee exclusive use of the radio spectrum. Communications in communications system 100 may also occur over unlicensed spectrum that is generally freely available for use by approved communications devices. Communications devices operating in unlicensed spectrum typically share one or more communications channels. The communications devices operating in the unlicensed spectrum typically have to be able to tolerate interference from other communications devices while not causing undue interference to other communications devices. Communications system 100 may support communications in both licensed and unlicensed spectrum.

As discussed previously, in certain areas of the world, a listen before talk (LBT) process is required before a transmission is made in some portions of the unlicensed radio spectrum. In LBT, the transmitting device has to listen to the communications channel (or communications channels) to determine that the communications channel is idle before it can transmit. The process of determining if the communications channel is idle is part of a process commonly referred to as contending for access to the communications channel. As an example, if the transmitting device senses the communications channel for a specified period of time and if the energy detected on the communications channel is below a specified threshold (i.e., an energy detection threshold), the transmitting device will regard the communications channel as idle and the transmitting device continues with the communications channel contention process. If the communications channel is not idle, the transmitting device cannot transmit and the transmitting device may retry the communications channel contention process, potentially at a later time or in a different communications channel. Even if LBT operation is not required by governmental regulation, LBT operation is widely used to enable co-existence with widely deployed IEEE 802.11 compliant communications systems (commonly referred to as WiFi systems). The specified period of time that the transmitting device senses the energy on the communications channel is dependent on the communications system. As an example, in The Third Generation Partnership Project (3GPP) Long Term Evolution (LTE) Licensed Assisted Access (LAA) and IEEE 802.11, the period of time is a random number of time slots that may differ based on traffic priority. A time slot (sometimes known as a "slot") is a duration of time that is specified in a technical standard or by an operator of the communications system, or is determined through collaboration between communicating devices.

Bursty communications may be characterized by short periods of intense communications traffic occurring within long periods of silence. Bursty communications are considered to be a good candidate for communicating on unlicensed spectrum because the sparseness of the communications decreases the likelihood that the communications channel is busy when a transmitting device has data to transmit.

Transmission uncertainty presents a problem for communications systems that utilize scheduled communications (such as communications systems that are compliant with the 3GPP LTE family of technical standards) because the communications have to be scheduled in advance of the transmitting device determining communications channel availability or after the transmitting device successfully contended for the communications channel. If a communication is scheduled in advance and the communications channel is available, the transmission may take place as intended. However, if the communications channel is unavailable, the work associated with the scheduling of the transmissions is wasted because the transmitting device is unable to transmit at the intended times and frequencies. If the communication is scheduled after successful contention for access to the communications channel, the time involved with scheduling the communication adds to the communication latency. Additionally, if the time required for scheduling the communication is too long, another communicating device may have begun accessing the communications channel during that time, resulting in the communications channel no longer being available.

Figure 2:
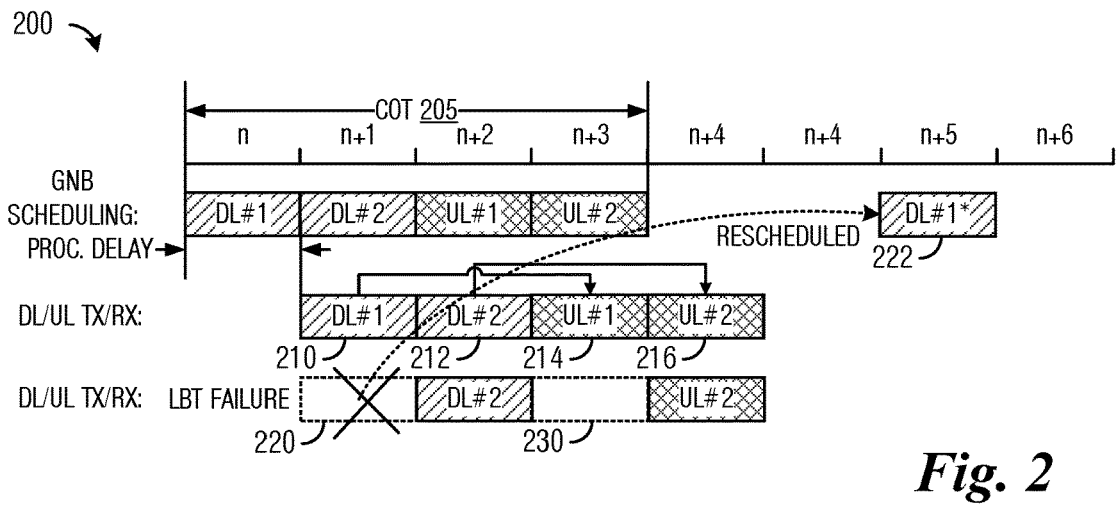
FIG. 2 illustrates a first timing diagram highlighting a pipeline for scheduling and transmitting of a burst transmission in a 3GPP LTE LAA compliant communications system.

FIG. 2 illustrates a first timing diagram 200 highlighting a pipeline for scheduling and transmitting of a burst transmission in a communications system. In the communications system, a transmitting device, such as a gNB, schedules a channel occupancy time (COT) 205 comprising two downlink (DL) transmission time intervals (TTIs) (shown as DL #1 210 and DL #2 212) and two uplink (UL) TTIs (shown as UL #1 214 and UL #2 216). A COT is defined as a time period during which a device can have access to a given channel without re-evaluating the availability of that channel. A maximum COT (MCOT) is a maximum amount of time a device is allowed to occupy the channel after obtaining access to the channel. In general, a COT is less than or equal to MCOT.

As shown in FIG. 2, a transmission prepared for DL #1 210 is scheduled for transmission in slot n+1, and is prepared for transmission in the previous time slot n. In general, a slot is a duration of time and is one of a variety of time domain resources of a communications system. As an example, in a 3GPP LTE communications system configured for frequency division duplexing (FDD) operation, a slot is 0.5 ms in duration and comprises six or seven orthogonal frequency division multiplexing (OFDM) symbols. Furthermore, two slots make up a subframe, 10 subframes form a frame, and a TTI is a subframe. In a 3GPP NR communications system, a slot contains 14 OFDM symbols. Slots, mini-slots containing 1, 2, 4, or 7 OFDM symbols, or a combination thereof can be used for scheduling. In 3GPP NR, a TTI can be any combination of slots, mini-slots, etc., that are used for scheduling. Other communications systems have other slot configurations. Other TTIs are similarly prepared for transmission prior to their scheduled transmissions. UL #1 214 is specified by information included in DL #1 210, and UL #2 216 is specified by information included in DL #2 212. COT 205 comprises four slots. However, a COT, in general, can include an arbitrary number of slots (unless restricted by technical standard or deployment setting).

If a LBT process performed by the transmitting device for slot n+1 determines that the communications channel is unavailable for slot n+1 (shown as LBT failure 220) the transmitting device discards the transmission that was prepared for DL #1 210. The transmission cannot be reused in a later slot because the signals generated for slot n+1 are time dependent. Furthermore, remaining time is not sufficient for generating signals for DL #1 in slot n+1. The transmission prepared for DL #1 210 is delayed for a time period because it is rescheduled by a media access control (MAC) layer entity and regenerated by a physical (PHY) layer entity (shown as DL #1***222). The rescheduling of the transmission prepared for DL #1 210 may be in accordance with a hybrid automatic repeat requested (HARQ) retransmission procedure. Because the transmission prepared for DL #1 210 was not transmitted, information about UL #1 214 was not sent and slot n+3 cannot be used for the intended uplink grant (shown as block 230). Additionally, due to a long time gap between the downlink burst (DL #2 212) and the uplink burst (UL #2 216), another communications system, such as a co-inhabiting WiFi system, may obtain access to the communications channel and block the transmission prepared for UL #2 216. Furthermore, the computational resources and processing capability of the transmitting device are wasted because packets that have been prepared for transmission will be discarded due to the unavailability of the communications channel. Under heavy network load scenarios, the likelihood of the communications channel being busy increases, therefore, the likelihood of transmissions prepared for particular slots being discarded also increases, resulting in increased computational resource and processing capability waste.

Figure 3:
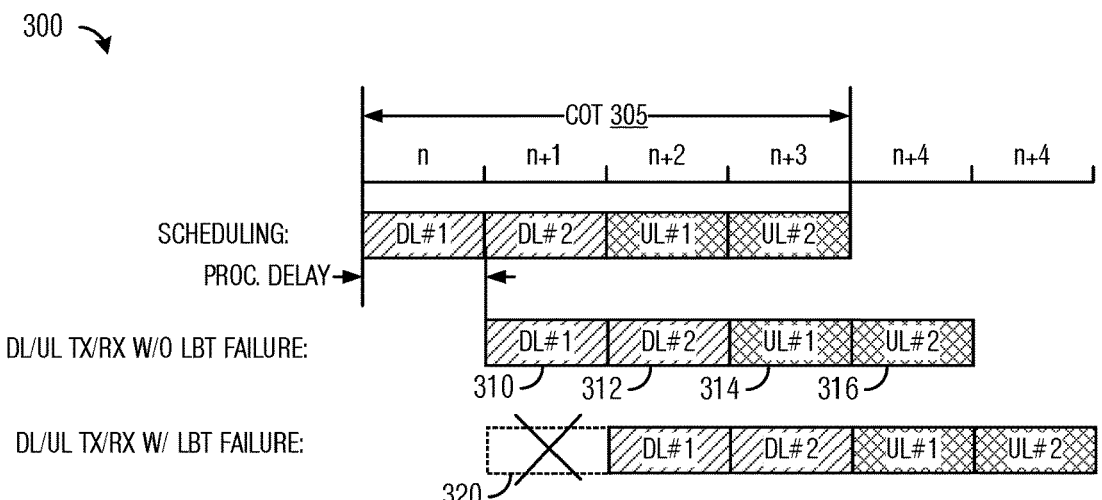
FIG. 3 illustrates a second timing diagram highlighting a prior art technique for pipelining the scheduling and transmitting of a burst transmission in a communications system.

FIG. 3 illustrates a second timing diagram 300 highlighting a prior art technique for pipelining the scheduling and transmitting of a burst transmission in a communications system. A transmitting device, such as a gNB, schedules a COT 305 comprising two DL TTIs and two UL TTIs (shown as DL #1 310, DL #2 312, UL #1 314, and UL #2 316, respectively). A LBT process performed by the transmitting device for slot n+1 determines that the communications channel is unavailable for slot n+1 (shown as block 320). However, the entirety of COT 305 is deferred until the communications channel is available. As shown in FIG. 3, the communications channel becomes available for slot n+2 and COT 305 is transmitted in its entirety starting at slot n+2. However, due to a limited amount of time remaining after the transmitting device determines that the communications channel is unavailable for slot n+1, the transmitting device has to regenerate the signals of DL #1 310 for slot n+2 in a very short period of time, which increases the hardware requirements on the transmitting device. Otherwise, signals that are completely independent of time are used for the entirety of COT 305, which results in compromised interference whitening arising from interactions with the transmission of COTs using time independent signals by neighboring cells. Some communications systems, such as WiFi, trade off increased preamble length in order to maintain a high level of interference whitening from neighboring cells.

According to an example embodiment, a time independent initial block (or initial blocks) is included in a COT. The initial block is used for burst identification or slot identification. The initial block may also be referred to as an identification signal or identification block. The initial block is independent of an absolute time, such as a system time, absolute slot index, absolute mini-slot index, etc. In general, an initial block is independent of a slot index, subframe index, or symbol index that is itself, relative to a cell specific synchronization signal. Nevertheless, when multiple initial blocks are transmitted in the time domain within a COT, they are still dependent on their relative slot indices with respect to the reference slot, subframe, or symbol of that COT. The inclusion of the time independent initial block in the COT addresses issues, such as the interruption of a COT transmission due to LBT failure and the discarding of transmissions prepared for TTIs, the large packet delay due to HARQ rescheduling, the waste of computational and processing resources, the high hardware requirement associated with processing delays, and the degraded interference whitening performance. In an embodiment, the initial block includes a predefined signal or sequence to help ensure reliable detection by receiving devices. The predefined signal or sequence is referred to as an initial sequence. The initial sequence may be defined by a technical standard, operator of the communications system, or agreed upon by the communicating devices through collaboration.

In an embodiment, the initial block also includes downlink control information included in a downlink control field. The downlink control information includes configuration information for a subsequent COT. As an example, the configuration information includes at least the remaining duration of the COT (e.g., a number of slots or mini-slots), and the composition of the COT (e.g., a downlink transmission type, an uplink transmission type, or an unknown or flexible transmission type for each slot or mini-slot of the COT).

According to an example embodiment, a transmitting device transmits a time independent initial block (or initial blocks) in a COT. The inclusion of a time independent initial block eliminates the need to regenerate an initial block that is time dependent if the communications channel is unavailable and the COT has to be rescheduled. The COT may be a downlink only COT or a shared downlink and uplink COT with one or more switch points. A switch point is when, in a shared COT, a downlink portion of the shared COT becomes an uplink portion, and vice versa. In an embodiment, the initial block includes an initial sequence that is known to the UE. In an embodiment, the initial block is included at or near the beginning of the COT. In an embodiment, the initial block is included at or near the beginning of at least some of the downlink portions of the COT. In an embodiment, the initial block is included at or near the beginning of at least some of the downlink portions of the shared COT, if multiple switch points are configured. The placement of the initial block at or near the beginning of the COT enables earlier detection of the COT (when compared to the initial block being placed at the middle or end of the COT). Additionally, after the detection of the initial block, the UE begins blind detection of the PDCCH. In an embodiment, the initial block also includes a DL control field that includes configuration information of the COT. In an embodiment, the transmit DL portions (e.g., DL TTIs) of the COT are scrambled using scrambling sequences that are based on a slot index that is relative to the start of the COT. In an embodiment, the receive UL portions (e.g., UL TTIs) of the COT are scrambled using scrambling sequences that are based on a slot index that is relative to the start of the COT. The use of scrambling sequences that are based on the slot index that is relative to the start of the COT also eliminates the need to regenerate the signals for the transmit DL portions and the receive UL portions should the COT be rescheduled.

It will be understood that, in this embodiment, a UE only detects the initial block to determine the beginning of the COT. After detecting the COT, the UE performs blind detection of the PDCCH for the duration of the COT. After the end of the COT, the UE resumes detecting only the initial block to determine the presence of the next COT.

According to an example embodiment, a receiving device receives a time independent initial block (or initial blocks) and determines the beginning of a COT. In an embodiment, receive DL portions (e.g., DL TTIs) of the COT are scrambled using scrambling sequences that are based on a slot index that is relative to the start of the COT. In an embodiment, the transmit UL portions (e.g., UL TTIs) of the COT are scrambled using scrambling sequences that are based on a slot index that is relative to the start of the COT. Although the discussion focuses on slot index and indices, the example embodiments presented herein are also operable with mini-slot or symbol index and indices. Therefore, the discussion of slot indices should not be construed as being limiting to the scope of the example embodiments.

Figures 4, 5:
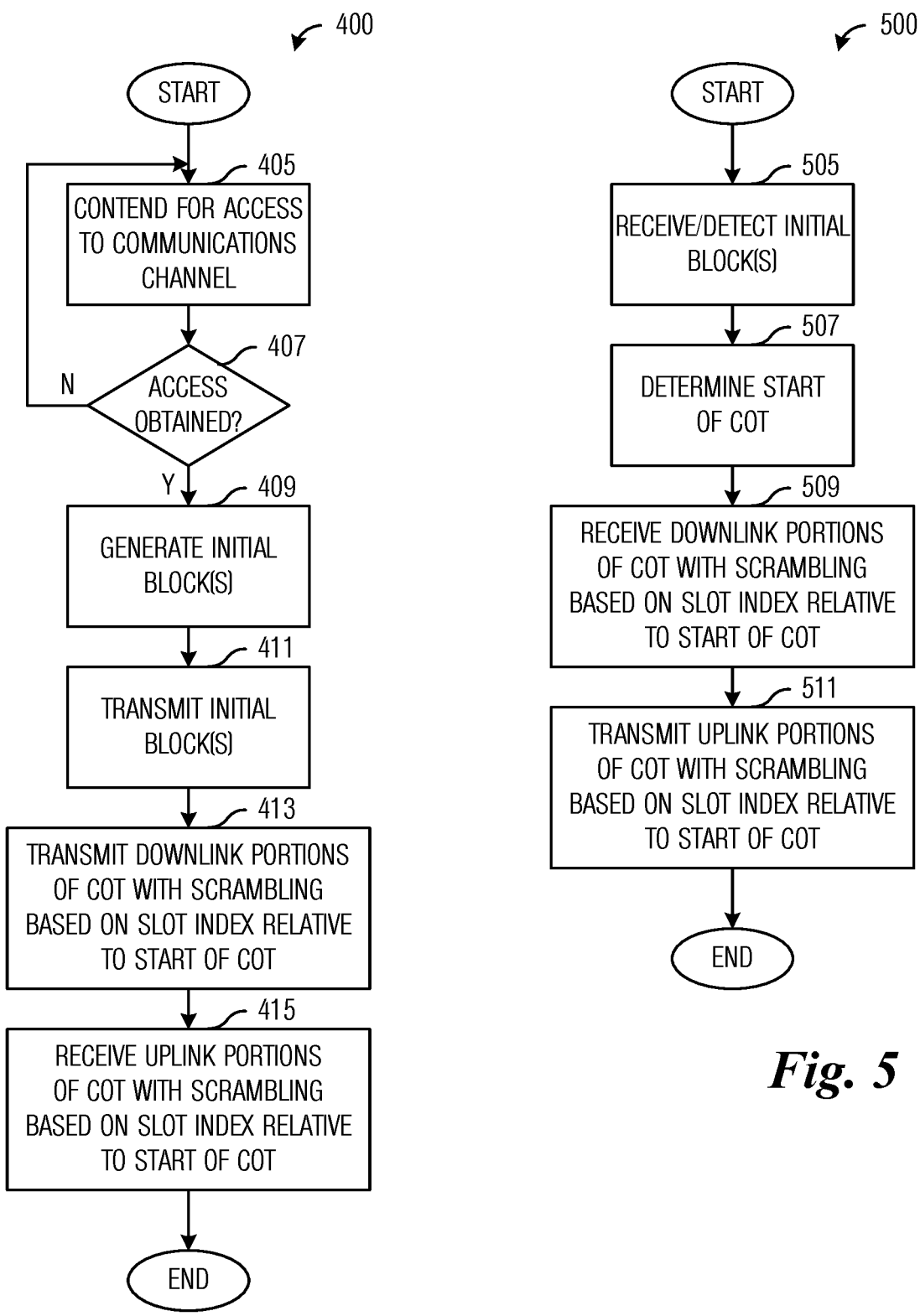
FIG. 4 illustrates a flow diagram of example operations occurring in an access node according to example embodiments described herein.
FIG. 5 illustrates a flow diagram of operations occurring in a UE according to example embodiments described herein.

FIG. 4 illustrates a flow diagram of example operations 400 occurring in an access node. Operations 400 may be indicative of operations occurring in an access node as the access node participates in communications with a UE. As an illustrative example, the access node is participating in communications (e.g., bursty communications) with the UE. The bursty communications includes downlink transmissions only or both downlink and uplink transmissions. The communications occurs in licensed or unlicensed spectrum.

Operations 400 begin with the access node contending for access to a communications channel (block 405). The access node may contend for access to the communications channel by measuring energy on the communications channel for a specified amount of time and if the measured energy is below a threshold, the access node determines that the communications channel is idle and obtains access to the communications channel. If the measured energy is above the threshold, the access node determines that the communications channel is not idle and not available for access. Although the discussion focusses on a single communications channel, the example embodiments presented herein are operable with more than one communications channels, with the communications channel being contiguous in frequency or non-contiguous in frequency, with or without carrier aggregation, with or without channel bonding, and so on. Therefore, the discussion of a single communications channel should not be construed as being limiting to the scope of the example embodiments.

The access node performs a check to determine if access to the communications channel was obtained (block 407). If access to the communications channel was not obtained, the access node returns to block 405 to continue contending for access to the communications channel. The access node may wait for a period of time before it repeats the contention for access to the communications channel.

If the access node was able to obtain access to the communications channel, the access node generates an initial block (block 409). The initial block is independent of the absolute slot index determined during downlink synchronization. In other words, the initial block is not based on an absolute slot index of a slot where the access node intends to transmit the initial block. In an embodiment, the initial block includes a predefined signal or a sequence (referred to as an initial sequence) that is known to the UE. The initial block may also include downlink control information included in a downlink control field. The downlink control information includes configuration information for a following COT. The configuration information includes at least the remaining duration of the COT (e.g., a number of slots or mini-slots or symbols), and the composition of the COT (e.g., downlink transmission, uplink transmission, or unknown transmission for each slot or mini-slot of the COT). In an embodiment, the initial block is generated by the access node prior to or during the access node contending for the communications channel. The access node transmits the initial block (block 411).

The access node transmits downlink transmission portions of COT with scrambling based on a slot index relative to the slot where the initial block was transmitted (block 413). In other words, the downlink transmissions made by the access node are scrambled based on a slot index relative to the start of the COT. The access node receives uplink transmissions of COT with scrambling based on a slot index relative to the slot where the initial block was transmitted (block 415). In other words, the uplink transmissions received by the access node are scrambled based on a slot index relative to the start of the COT. In a situation where there are multiple switch points in the COT and where the access node transmitted a single initial block at or near the beginning of the COT, the access node may continue to transmit downlink bursts within the COT with the relative slot indices relative to the slot where the single initial block was transmitted. In a situation where there are multiple switch points in the COT and where the access node transmitted initial blocks at or near the beginning of at least some of the downlink portions, the access node may continue to transmit downlink bursts within the COT with the relative slot indices relative to the slot wherein the most recent initial block was transmitted. The transmission of a plurality of initial blocks allows the access node to change the structure of the COT as well as send indications of the changed COT structure, in the downlink control field, for example.

In an embodiment, when a COT comprises multiple switch points, the access node may transmit initial blocks at or near the beginning of at least some of the downlink portions. The slot indices used for the downlink portions are relative to the slot wherein the most recent initial block was transmitted, and the slot indices used for the uplink portions are the absolute slot indices of the slots including the respective uplink portions. In other words, the downlink portions of a COT utilize slot indices that are relative to the slots where the most recent initial block was transmitted, and the uplink portions of the COT utilize absolute slot indices.

FIG. 5 illustrates a flow diagram of operations 500 occurring in a UE. Operations 500 may be indicative of operations occurring in a UE as the UE participates in communications with an access node. As an illustrative example, the UE is participating in communications (e.g., bursty communications) with the access node. The bursty communications includes downlink transmissions only or both downlink and uplink transmissions. The communications occurs in licensed or unlicensed spectrum.

Operations 500 begin with the UE receiving and detecting an initial block (block 505). Because the initial block includes a predefined signal or a sequence that is known to the UE, the UE is able to readily detect the initial block. In general, the UE attempts to receive and detect the initial block at every possible start point of a COT until the UE detects the initial block. The UE determines a start of the COT (block 507). The UE regards a slot where it was able to detect the initial block as the start of the COT, for example. As an illustrative example, if the initial block is detected in slot # n, then slot # n will be considered as a reference slot and the signals and sequences used in the transmissions and receptions will be relative to the reference slot. As an example, the transmissions and receptions are scrambled with a sequence generated relative to a slot index relative to the slot where the initial block was detected. The UE receives downlink portions of the COT with scrambling based on a slot index relative to the slot where the initial block was detected (block 509). The UE transmits uplink portions of the COT with scrambling based on a slot index relative to the slot where the initial block was detected (block 511). Prior to transmitting an uplink portion of the COT, the UE may contend for access to the communications channel.

If the UE received the initial block but was not able to successfully decode the control information field therein, the UE still has knowledge of a downlink transmission portion of the COT and can continue to monitor the shared communications channel for an additional initial block with associated control information field. The UE can continue the monitoring until it is able to receive and decode the initial block with associated control information field or until a maximum time (as defined by an MCOT, for example) has elapsed.

Figure 6:
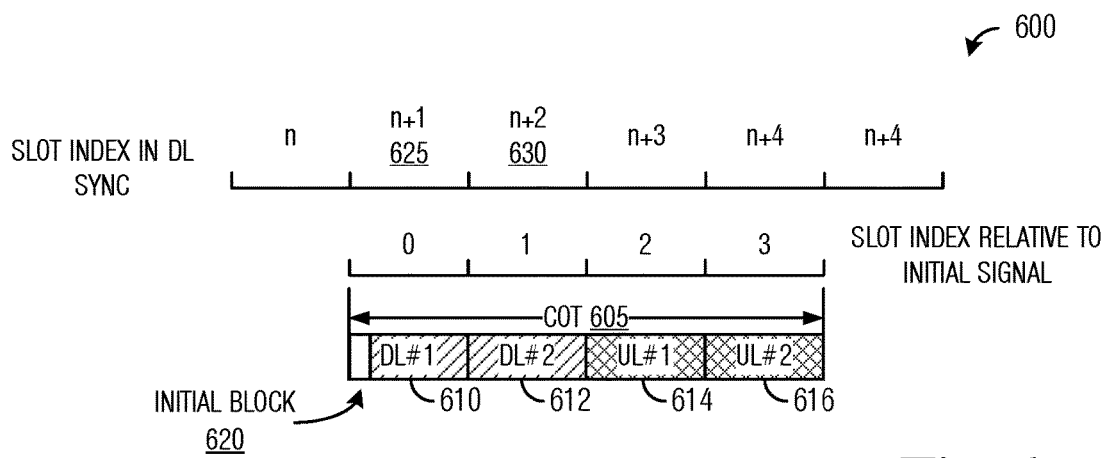
FIG. 6 illustrates a third timing diagram illustrating a technique for pipelining the scheduling and transmitting of a burst transmission utilizing an initial block to help reduce power consumption and processing complexity in situations with LBT failure according to example embodiments described herein.

FIG. 6 illustrates a third timing diagram 600 illustrating a technique for pipelining the scheduling and transmitting of a burst transmission utilizing an initial block to help reduce power consumption and processing complexity in situations with LBT failure. Timing diagram 600 displays a COT 605 including two DL TTIs (shown as DL #1 610 and DL #2 612) and two UL TTIs (shown as UL #1 614, and UL #2 616). COT 605 also includes an initial block 620 that is transmitted at the beginning or near the beginning of COT 605. As shown in FIG. 6, initial block 620 and DL #1 610 are transmitted in slot n+1 625, DL #2 612 is transmitted in slot n+2 630, and so on. A UE receiving and detecting initial block 620 regards slot n+1 625 as a reference slot and assigns a relative slot index zero to the slot 625. Slot n+2 630 is one slot after the reference slot and therefore is assigned relative slot index one. Remaining slots of COT 605 are similarly numbered, all relative to the reference slot. In a situation where a downlink portion starts within a slot duration with a mini-slot, the slot that includes the mini-slot is considered to be the reference slot.

According to an example embodiment, the initial sequence of the initial block is independent of slot index. In an embodiment, the content of the downlink control field, as well as the scrambling of the downlink control field and a demodulation reference signal (DMRS) of the downlink control field (if not used as the initial sequence) is dependent on the relative slot index. In an embodiment, the initial sequence is generated a priori. As an example, a secondary synchronization signal (SSS) as defined in 3GPP LTE and 3GPP New Radio (NR) is used for the initial sequence. A SSS sequence in 3GPP NR is defined as follows:

$$d_{sss}(n) = [1 - 2x_0((n + m_0) \bmod 127)][1 - 2x_i((n + m_1) \bmod 127)]$$
$$m_0 = 15 \left\lfloor \frac{N_{ID}^{(1)}}{112} \right\rfloor + 5N_{ID}^{(2)}$$
$$m_1 = N_{ID}^{(1)} \bmod 112$$
$$0 \leq n < 127,$$

where $N_{ID}^{(1)} \in \{0, 1, \ldots, 355\}$ and $N_{ID}^{(2)} \in \{0, 1, 2\}$. A physical cell identifier may be obtained according to $N_{ID}^{cell} = 3N_{ID}^{(1)} + N_{ID}^{(2)}$. The SSS is independent of slot index and can be generated a priori. A UE can reuse existing SSS detection hardware and algorithm, which helps simplify implementation. Additionally, the number of available SSS sequences is sufficiently large to avoid false detection of initial blocks of neighboring cells. Examples of sequences that are independent of slot index include SSS, primary synchronization signal (PSS), DMRS defined for a physical broadcast channel (PBCH), PDCCH DMRS, DMRS with a predefined slot index (e.g., slot index zero but other values are possible), short training and long training sequences as specified in IEEE 802.11 technical standards, and so on.

The use of a SSS sequence for an initial sequence offers a variety of benefits, including: reliable detection performance; independence of absolute slot index; sufficient number of unique sequences to differentiate from neighbor cells; will not increase synchronization signal block (SSB) false detection for initial access UEs; and reuses existing detection hardware. The design of the control information field allows for independence of slot index and sufficient capacity to accommodate information bits.

Figure 7:
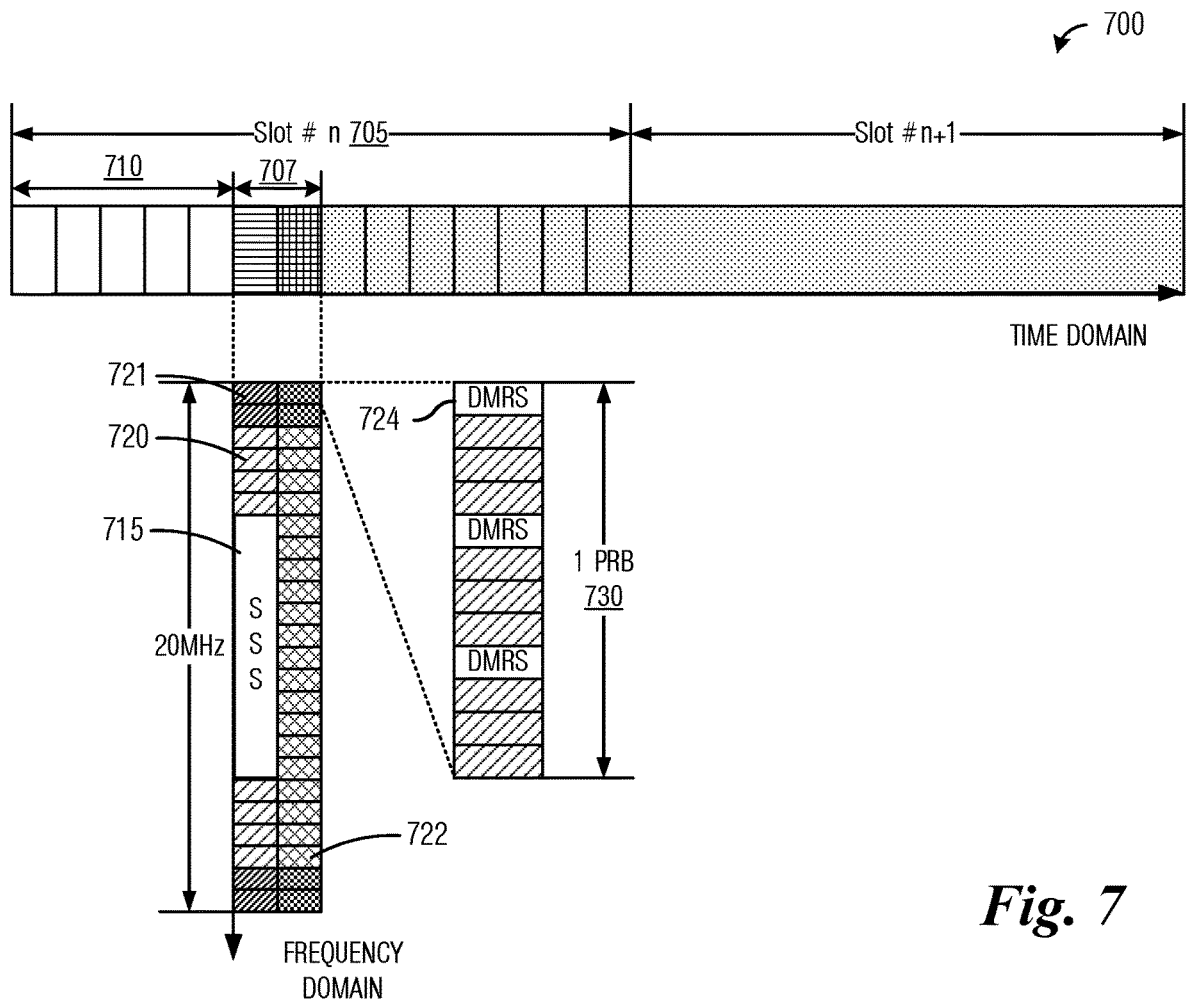
FIG. 7 illustrates an example slot structure of a COT, highlighting a SSS as an initial sequence according to example embodiments described herein.

FIG. 7 illustrates an example slot structure of a COT 700, highlighting a SSS as an initial sequence. In slot n 705, the initial block is transmitted in sixth and seventh OFDM symbols 707 after an access node successfully contends for access to a 20 MHz communications channel (shown as occurring during first five OFDM symbols 710 of slot n 705). The initial block being transmitted in sixth and seventh OFDM symbols 707 is for illustrative purposes only. The duration of the initial block is dependent upon the content of the initial block. Hence, the illustration of the two symbol long initial block should not be construed as being limiting to the scope of the example embodiments. The SSS (i.e., the initial sequence) of length 127 is transmitted in a total of 14 physical resource blocks (PRBs) 715. Discussion of the initial block being transmitted in sixth and seventh OFDM symbols 707, and the length 127 initial sequence occupying 14 PRBs around the center frequency of the OFDM symbol are for illustrative purposes only; the initial block may be transmitted in a different OFDM symbol, and the initial sequence may be of different length and occupy a different number of PRBs. The channel contention may occur prior to slot n 705.

The downlink control field carries the configuration of COT 705 and may be multiplexed with the initial sequence in a frequency division multiplexed (FDM) manner or a time division multiplexed (TDM) manner (such as PRBs 720 and 722). A DMRS defined for a PBCH in 3GPP TS 38.211 may be used in each PRB of the control information field. As shown in FIG. 7, a DMRS is carried in a tone, such as subcarrier 724. As another example, a DMRS defined for a PDCCH may be used in each PRB of the control information field with the slot index set to a predefined value, e.g., zero.

It is shown in FIG. 7 that all or part of 12 PRBs remaining in the same OFDM symbol as the initial sequence may be used to carry the control information field of the initial block (e.g., PRBs 720 and 721). Within each PRB, such as PRB 730, three subcarriers (e.g., subcarrier 724) are used for DMRS. A similar resource mapping and sequence generation used for PDCCH DMRS, defined in 3GPP TS38.211, may also be used assuming a predefined slot index, e.g., slot index zero. The initial blocks may also have additional OFDM symbols for the control information field (e.g., PRB 722). If other subcarrier spacings or bandwidths are adopted, the number of PRBs used by the initial sequence and control information fields may be different from what is shown in FIG. 7.

As shown in FIG. 7, the initial sequence (SSS in PRBs 715) is located at the center of the communications channel by default. However, the access node can also configure the position of the initial sequence in system information, e.g., a PBCH, remaining system information (RMSI), or other system information (OSI), or through UE specific radio resource control (RRC) signaling. In addition to the position of the initial sequence, other parameters of the initial block may be configured, including: a number of OFDM symbols in the time domain, a number of physical resource blocks (PRBs) in the frequency domain, sub-carrier spacing, and so on, for example. The configuration of the initial block may be included with the configuration of bandwidth parts (BWPs).

In an embodiment, the initial block also includes a parameter for a relative slot index of a current slot. The information, along with other downlink control information, may be encoded together as a single physical layer control channel (such as a PBCH) or encoded as an individual DCI with the resource mapping of a PDCCH in a common search space.

According to an example embodiment, a wideband control resource set (CORESET) is configured at the first or several slots or mini-slots of a COT. The DMRS of each PRB within the CORESET are configured in a similar manner as the DMRS of PBCH or DMRS of PDCCH with predefined slot index from a resource mapping and scrambling perspective, as defined in 3GPP TS 38.211, which are independent of slot index. The DMRS sequence in the CORESET of the first slot or mini-slot of the COT serves as the initial sequence. Some of the PDCCH candidates in the CORESET may be used to carry the downlink control information, as described previously. The remainder of the CORESET in the COT that is not carrying the initial block follows the CORESET configuration for CORESETs as specified in 3GPP NR and uses the PDCCH DMRS. In other words, the remainder of the CORESET within the COT does not necessarily have to be wideband. The CORESET carrying initial block(s) and not carrying initial block may have different configuration. For the remainder of the CORESET carrying the initial block, the UE will assume that the DMRS of the CORESET appears in each PRB even if some PDCCH candidates in the CORESET are not used.

The use of a CORESET to carry the initial block offers a variety of benefits, including: saving individual OFDM symbols for initial sequences and the DMRS sequences in the CORESET be shared with PDCCH search spaces for data channel scheduling; the initial block is independent of slot index; a PDCCH detection procedure is used (i.e., no specific initial block detection procedure is needed); a sufficient number of sequences are available to differentiate from neighbor cells; and does not increase SSB false detection for initial access UEs.

In an embodiment, the CORESET does not include a SSS to be used as an initial sequence. Instead, the DMRS sequence is used as an initial sequence. The remainder of the PRBs in the signal may be used to convey control information, in accordance with the PBCH structure. As an example, the initial sequence and the control information may be coded together.

In an embodiment, the initial sequence of the initial block is a separate sequence that is independent of slot index, such as SSS, PSS, short training and long training sequences as specified in IEEE 802.11 technical standards, and so on. In an embodiment, the initial sequence of the initial block is a DMRS, such as a PBCH DMRS, a PDCCH DMRS, a DMRS with a predefined slot index (e.g., slot index zero but other values are possible), and so on. In an embodiment, the downlink control field follows the structure of a PDCCH. In an embodiment, the downlink control field follows the structure of a PBCH.

Figure 8:
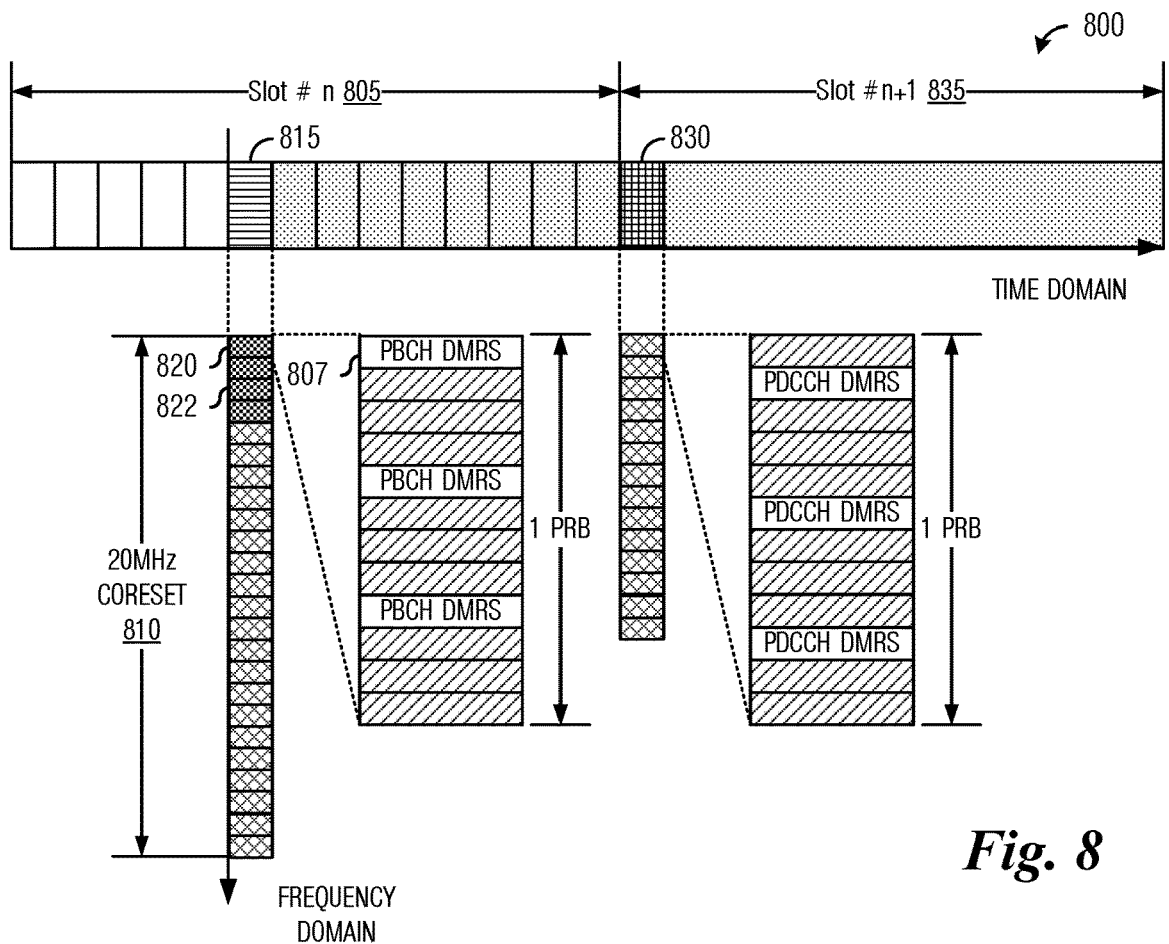
FIG. 8 illustrates an example slot structure of a COT, highlighting a CORESET used to carry an initial sequence according to example embodiments described herein.

FIG. 8 illustrates an example slot structure of a COT Boo, highlighting a CORESET used to carry an initial sequence. In slot n 805, PBCH DMRS (such as PBCH DMRS 807) of a CORESET 810 carried in OFDM symbol 815 serves as the initial sequence. PRBs (such as PRBs 820 and 822) are used to carry downlink control information for COT 800. A CORESET carried in OFDM symbol 830 of slot n+1 835 may be a regular CORESET conforming to PDCCH DMRS mapping rules. In an embodiment, a CORESET carrying the initial blocks, such as CORESET 810, may be configured by system information, which may be signaled by PBCH, RMSI, OSI, or RRC signaling. The configuration of the CORESET carrying the initial blocks may also be signaled along with BWP configuration. Prior to a UE detecting a PDCCH with the assumption of a regular CORESET configuration, the UE may assume a CORESET configuration that includes the CORESET carrying an initial block.

According to an example embodiment, in a wideband deployment, one initial block of a plurality of initial blocks is transmitted on each subband where a LBT process succeeds. When an access node is configured for wideband transmission, such as through carrier aggregation (CA) or single wideband component carrier (CC), one initial block of a plurality of initial blocks is transmitted on each subband where a LBT process succeeds. A UE may obtain the actual transmission bandwidth of the COT by detecting the existence of initial blocks on each subband. If CA is used, the initial block on each CC will be different because each CC has its own cell identifier. If single wideband CC is used, the initial block is duplicated on each subband assuming the same cell identifier is used.

The reliability of detection of the initial block is increased by transmitting multiple initial blocks or sequences in the frequency domain, the time domain, or both the frequency and time domains. The simplified initial block reduces communications overhead in a situation when multiple initial blocks are transmitted.

Figure 9A:
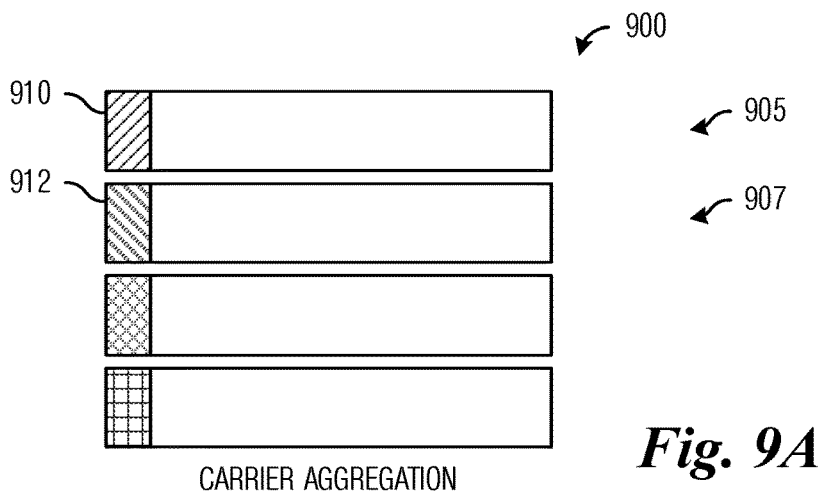
FIG. 9A illustrates a wideband COT in a deployment utilizing CA according to example embodiments described herein.
Figure 9B:
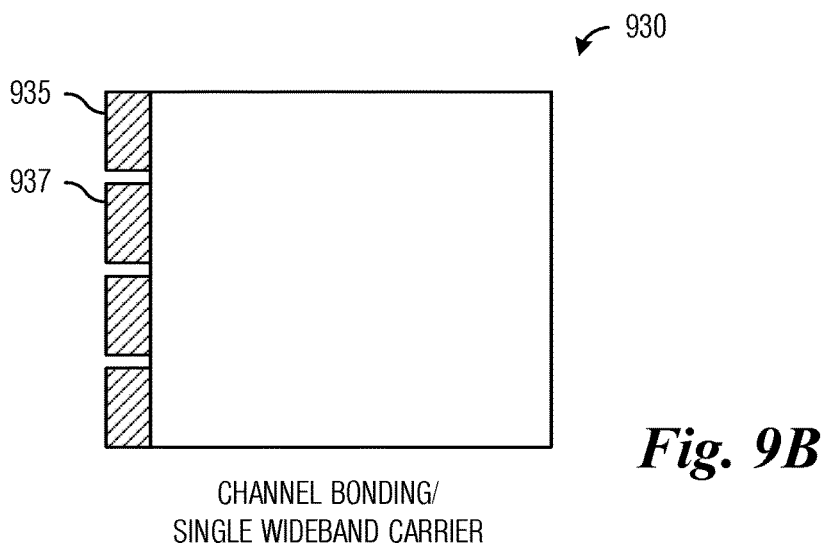
FIG. 9B illustrates a wideband COT in a deployment utilizing a single wideband CC according to example embodiments described herein.
Figure 9C:
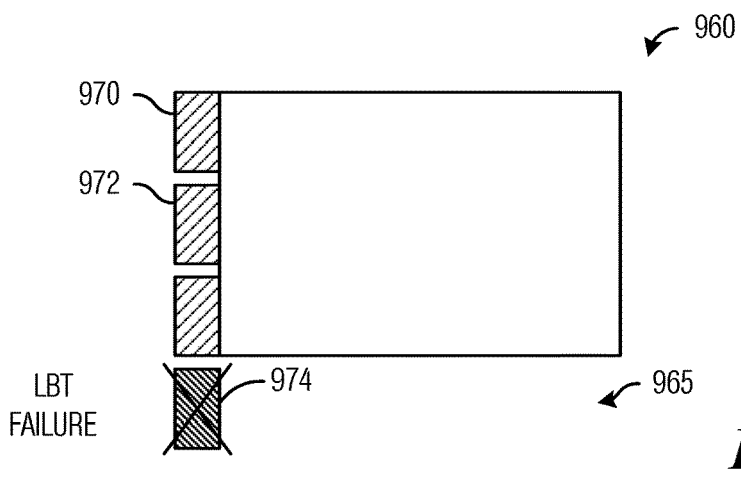
FIG. 9C illustrates a wideband COT in a deployment utilizing a single wideband CC, highlighting a failed LBT process in one of the channels according to example embodiments described herein.

FIG. 9A illustrates a wideband COT 900 in a deployment utilizing CA. As shown in FIG. 9A, COT 900 comprises four CCs, such as CC 905 and CC 907. Each of the four CCs carries a different initial block, such as initial blocks 910 and 912, because each CC has its own cell identifier. FIG. 9B illustrates a wideband COT 930 in a deployment utilizing a single wideband CC. COT 930 comprises four bonded channels. Each of the four channels carries a copy of an initial block, such as initial blocks 935 and 937. In an alternative embodiment, in a wideband COT deployed using a single wideband CC comprising a plurality of bonded channels, each channel in a subset of the plurality of bonded channels will carry a copy of the initial block. In other words, some of the bonded channels will carry a copy of the initial block. At a UE receiving the wideband COT, when the UE detects the initial block on any one of the channels, the UE will be able to obtain full knowledge of the wideband COT. In this deployment, the UE is not required to detect the initial block on each channel, therefore, the computational requirements on the UE is reduced. Reduced computational requirements may enable the use of a lower complexity UE. FIG. 9C illustrates a wideband COT 960 in a deployment utilizing a single wideband CC, highlighting a failed LBT process in one of the channels. As shown in FIG. 9C, COT 960 comprises four bonded channels, however, channel 965 is determined to be unavailable during a LBT process and is not used in COT 960. Hence, COT 960 comprises the three bonded channels that are available. Each of the three channels carries a copy of an initial block, such as initial blocks 970 and 972. Because channel 965 is unavailable, the initial block is not transmitted in resources 974 of channel 965.

In a situation when there are multiple slots or mini-slots in the COT, the access node may transmit an initial block from a plurality of initial blocks at the beginning of several or all slots or mini-slots. The presence of the plurality of initial blocks provides additional reliability if some UEs miss early initial blocks or are not configured to monitor initial blocks at every possible start point. The relative slot index and the COT structure in the initial blocks may be updated by the access node according to the slot where the initial blocks are transmitted. If a UE detects multiple initial blocks, the UE will update based on a most recently received version of the initial block. In order to save communications overhead, it is possible to define a simplified version of the initial blocks, which includes only a portion of the downlink control information included in the full initial blocks, for example. As an example, the simplified initial blocks include only a relative slot index of the current slot in the control information field, along with the initial sequence. Alternatively, a simplified version of the initial block includes only the initial sequence.

The access node may transmit the simplified initial block in one or more slots after the one or more slots carrying the full initial blocks within the COT. The initial sequence in the full initial block and the simplified initial block may be different in order to allow the UE to recognize the different initial blocks. The different initial block formats may also be distinguished by different scrambling sequences or radio network temporary identifier (RNTI) on the cyclic redundancy check (CRC) of the downlink control information following the initial sequence.

Figure 10:
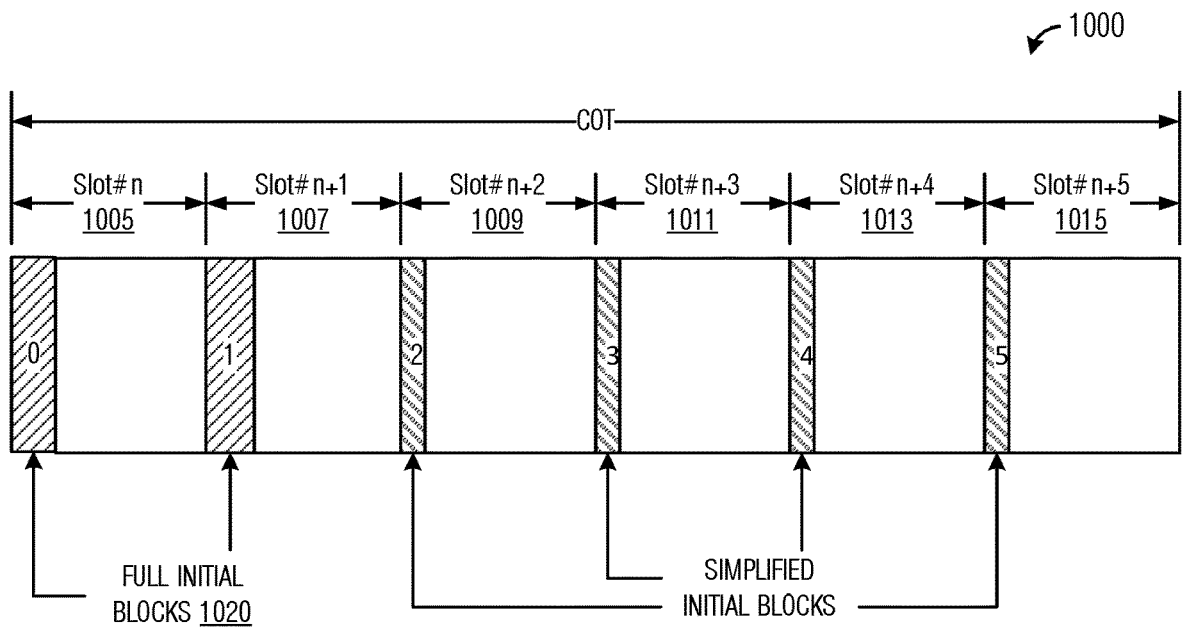
FIG. 10 illustrates an example slot structure of a COT, highlighting full and simplified initial blocks according to example embodiments described herein.

FIG. 10 illustrates an example slot structure of a COT 1000, highlighting full and simplified initial blocks. COT 1000 comprises six slots, slots n through n+5. As shown in FIG. 10, full initial blocks 1020 are transmitted in slots n 1005 and n+1 1007, and simplified initial blocks 1025 are transmitted in slots n+2 1009, n+3 1011, n+4 1013, and n+5

1015. As discussed previously, the simplified initial blocks may include a reduced version of the downlink control information included in the full initial blocks. Although COT 1000 is shown to include two instances of the full initial blocks and four instances of the simplified initial blocks, there are no limitations on the number of full initial blocks and simplified initial blocks in any particular COT. Furthermore, every slot of COT 1000 is shown to include an initial block. However, it is not required that every slot in a COT include an initial block, either full initial block or simplified initial block. Additionally, in a situation when a COT includes multiple CCs, a first subset of the CCs may convey full initial blocks and a second subset of the CCs may convey simplified initial blocks. Also, the CCs of the first subset and the second subset can change for different slots or mini-slots.

Figure 11:
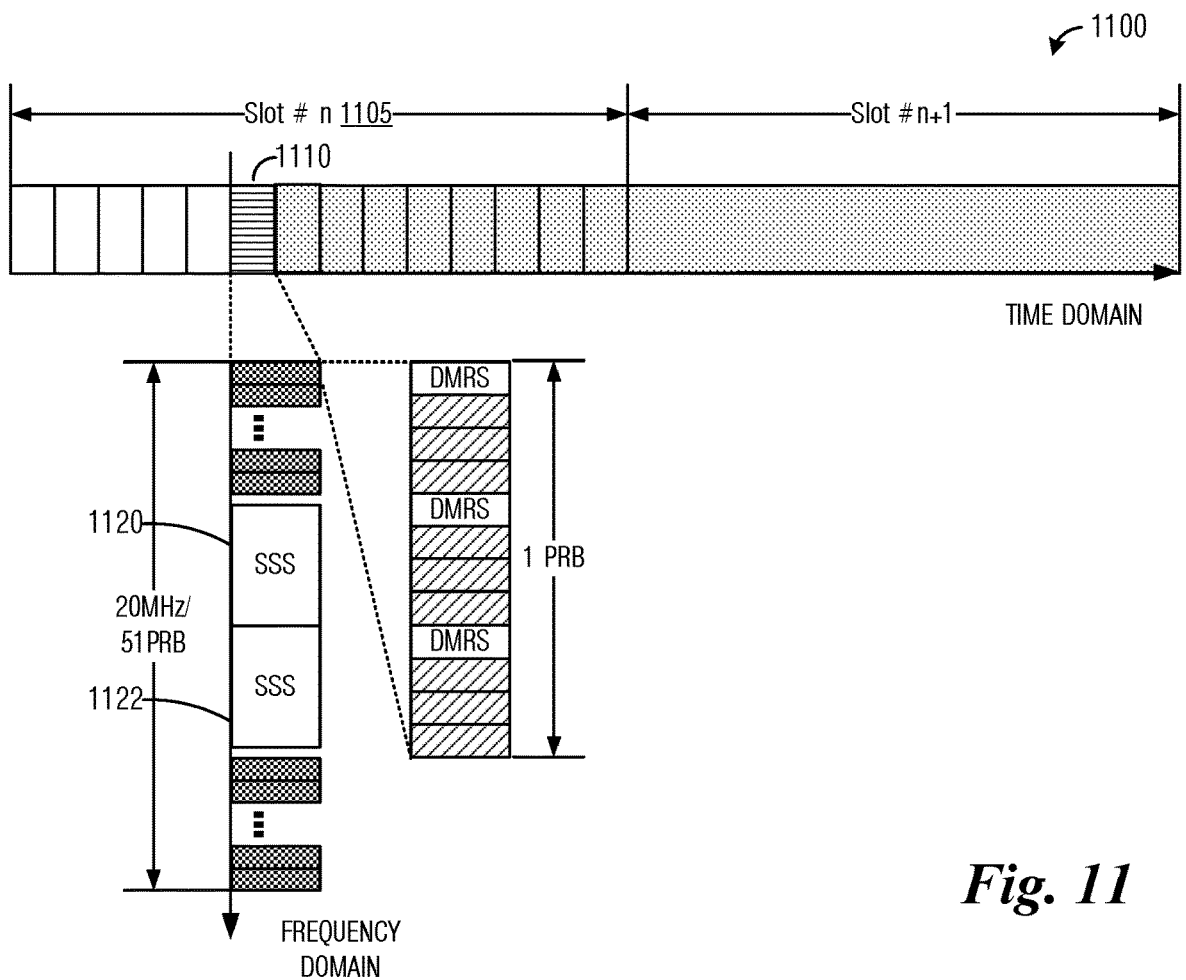
FIG. 11 illustrates an example slot structure of a COT, highlighting multiple initial sequences in an initial block according to example embodiments described herein.

In a situation when smaller subcarrier spacing (SCS) is adopted, such as 15 kHz or 30 kHz, the initial sequence may be duplicated from specific unit sequences, such as a SSS, within the carrier bandwidth and repeated multiple times. The coverage or reliability of the initial sequence may be improved with increased transmit power within the signal bandwidth. FIG. 11 illustrates an example slot structure of a COT 1100, highlighting multiple initial sequences in an initial block. As shown in FIG. 11, OFDM symbol 1110 of slot n 1105 of COT 1100 conveys an initial block. The initial block includes at least two instances of an initial sequence, SSS 1120 and 1122. Each instance of the initial sequence may have smaller bandwidth than a single initial sequence. However, the initial sequence instances may be spread apart within the frequency domain to increase frequency diversity, for example.

According to an example embodiment, the initial sequence of the COT is independent of the absolute slot index, while any remaining sequences of the COT is based on a relative slot index, relative to the start of the COT. The remaining sequences, e.g., the DMRS of the PDCCH, PDSCH, or CSI-RS, are based on the relative slot index of the slot or mini-slot where the initial sequence is transmitted. The relative slot index is relative to the start of the COT.

Because the remaining sequences are based on the relative slot index, the signals are independent of the absolute index obtained from downlink synchronization. The generated signals may be buffered when a LBT failure occurs and reused at a later slot, instead of being discarded. Hence, computation resources of the transmitting device are saved.

In an example where scrambling sequences similar to those defined in 3GPP TS 38.211 are used, the initial number (or seed) used for initializing the pseudo-random number generator of the scrambling sequences are expressible as:

DMRS of PDCCH—

$c_{init}=(2^{17}(14n_s^\mu+l+1)(2N_{ID}+1)+2N_{ID})\bmod 2^{31}$;

DMRS or phase tracking reference signal (PTRS) of PDSCH—

$c_{init}=(2^{17}(14n_s^\mu+l+1)(2N_{ID}^{nSCID}+1)+2N_{ID}^{nSCID})\bmod 2^{31}$; or

CSI-RS—

$c_{init}(2^{10}\cdot(14n_s^\mu+l+1)(2n_{ID}+1)+n_{ID})\bmod 2^{31}$.

In an UL reception, the access node descrambles the DMRS of a physical uplink control channel (PUCCH) format 2 and DMRS or PTRS of PUSCH in a target slot or mini-slot using its relative slot index. Assuming that scrambling sequences similar to those defined in 3GPP TS 38.211 are used, the initial number (or seed) used for initializing the pseudo-random number generator of the scrambling sequences are expressible as:

DMRS of PUCCH format 2—

$c_{init}=(2^{17}(14n_s^\mu+l+1)(2N_{ID}^0+1)+2N_{ID}^0)\bmod 2^{31}$;

DMRS or PTRS of PUSCH without transform precoding—

$c_{init}=(2^{17}(N_{symb}^{slot}n_s^\mu+l+1)(2N_{ID}^{nSCID}+1)+2N_{ID}^{nSCID}+n_{SCID})\bmod 2^{31}$; or DMRS or PTRS of PUSCH with transform precoding—

$c_{init}=(2^{17}(14n_s^\mu+l+1)(2N_{ID}+1)+2N_{ID})\bmod 2^{31}$.

Additionally, group and sequence hopping for PUCCH format 0, 1, 3, and 4 are as follows:

Group hopping of PUCCH—

$f_{gh}=(\Sigma_{m=0}^7 2^m c(8(2n_s^\mu+n_{hop})+m))\bmod 30$ $f_{ss}=n_{ID}\bmod 30$ $v=0$ Sequence hopping of PUCCH—

$f_{gh}=0$ $f_{ss}=n_{ID}\bmod 30$;

$v=c(2n_s^\mu+n_{hop})$

Cyclic shift hopping of PUCCH—

$$\alpha_l=\frac{2\pi}{N_{sc}^{RB}}((m_0+m_{cs}+n_{cs}(n_s^\mu,l+l'))\bmod N_{sc}^{RB});$$

Group hopping of sounding reference symbol (SRS)—

$f_{gh}(n_s^\mu,l')=(\Sigma_{m=0}^7 c(8(n_s^\mu N_{symb}^{slot}+l_0+l')+m)\cdot 2^m)\bmod 30$; or $v=0$ Sequence hopping of SRS—

$f_{gh}(n_s^\mu,l')=0$ $$v=\begin{cases} c(n_s^\mu N_{symb}^{slot}+l_0+l') & M_{sc,b}^{SRS}\geq 6N_{sc}^{RB} \\ 0 & \text{otherwise} \end{cases}.$$

In the expressions presented above, the term $n_s^\mu$ is the relative slot index of the slot or mini-slot where the channels or signals are transmitted or received.

According to an example embodiment, in a spatial reuse (SR) deployment scenario, different relative slot indices are used for SR transmissions to improve inter-cell interference whitening at UEs in different cells of the SR access nodes. In SR deployment scenarios, the access nodes of the same operator network jointly access the unlicensed channel. Therefore, the transmissions of the SR access nodes overlap in the unlicensed time-frequency resources with either aligned or unaligned transmission start. The overlap of the unlicensed time-frequency resources can be realized by alignment of the transmission start point or by delayed joint channel access.

Due to the close proximity of the SR access nodes, scrambling or hopping performance similar to that of 3GPP NR frequency reuse is desired with unique scrambling or hopping sequences in concurrent slots across the different cells of the SR access nodes. However, in the system where SR transmissions are aligned at the start point, these transmissions share the same reference slot. This would result in the same relative slot indices being used to generate the concurrent transmissions across the different cells of the SR access nodes. Hence, the network or access node may need to generate the concurrent SR transmissions using different relative slot indices to improve the inter-cell interference whitening at the UEs in the different cells of the SR access nodes.

The use of different relative slot indices for SR transmissions allows 3GPP NR Unlicensed (NR-U) to harness the performance and coexistence benefits of SR in the unlicensed spectrum with either aligned or unaligned transmission start in different cells of the SR access nodes. Also, networks have the flexibility to change relative slot indices used for the generation of the downlink only or shared COT with respect to the UE side configuration by signaling a slot index offset so that the UE can apply the offset to the relative slot index and thus properly descramble or decode respective down link bursts, or generate uplink bursts. Furthermore, scrambling or hopping performance similar to that of 3GPP NR frequency reuse (with unique scrambling or hopping sequences) may be achieved in concurrent slots across inter-cell SR access nodes, which are likely to be in close proximity to each other. Additionally, the access node or network may be allowed to generate intra-cell SR transmissions of unaligned start points using the same relative slot indices over concurrent slots so that the same scrambling or hopping sequences are used in the concurrent slots of the intra-cell SR transmissions.

Figure 12A:
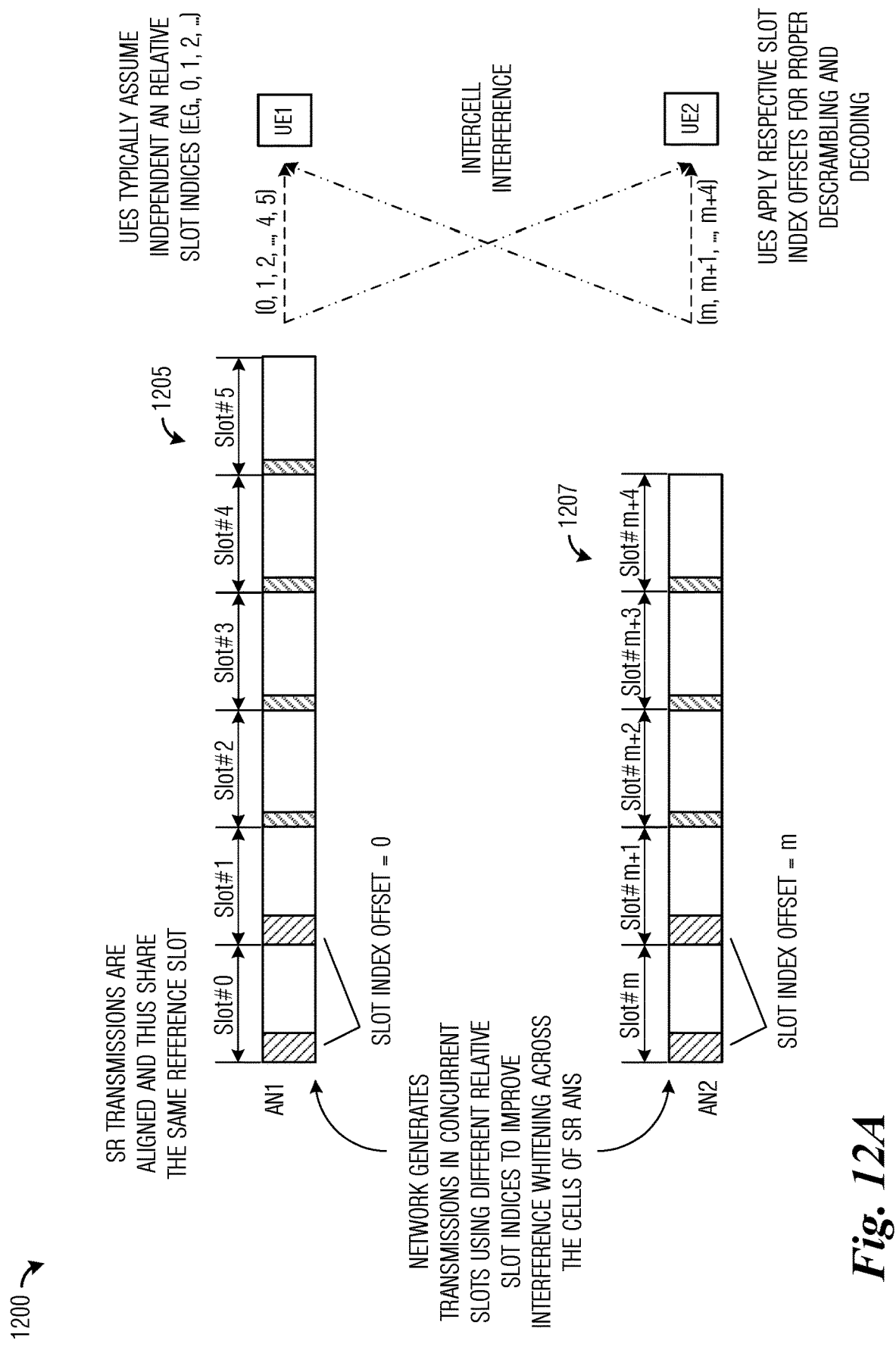
FIG. 12A illustrates example COTs transmitted by spatial reuse (SR) access nodes, highlighting the use of different relative slot indices to improve inter-cell interference whitening in a synchronous system when COTs start at the same time according to example embodiments described herein.

FIG. 12A illustrates example COTs transmitted by SR access nodes, highlighting the use of different relative slot indices to improve inter-cell interference whitening in a synchronous system. As shown in FIG. 12A, a first COT 1205 is transmitted by a first SR access node and a second COT 1207 is transmitted by a second SR access node. First COT 1205 and second COT 1207 are transmitted concurrently in the same slots starting from the same reference slot. If relative slot indices are used, same relative slot indices are going to be used across concurrent slots of the two COTs, and thus inter-cell interference whitening would be degraded. However, inter-cell interference whitening may be improved if different relative slot indices are used for the two COTs, resulting in different initial sequences or scrambling sequences. As an example, first SR access node sets the reference slot index to zero for transmissions of the first SR access node, and the reference slot index for transmissions of the second SR access node is set to m, where m is not equal to 0.

Because UEs are typically configured to assume that signals, sequences and channels are prepared based on independent channel access in which the default reference slot index is used, e.g., Slot #0, the downlink control field of an initial block may include a Slot Index Offset that the UEs apply to the relative slot indices for descrambling and decoding. If after applying the Slot Index Offset to the relative slot indices, any of the new relative slot indices exceed the maximum number of slots in a radio frame, a cyclic shift (or a modulo operation) may be applied to the new relative slot indices. As shown in FIG. 12, UEs receiving the COTs apply respective relative slot indices for proper descrambling and decoding. As an alternative to the Slot Index Offset, the relative slot index may also be carried in the downlink control field. If the relative slot index is not equal to zero, then the Slot Index Offset is included in the downlink control field, for example.

Figure 12B:
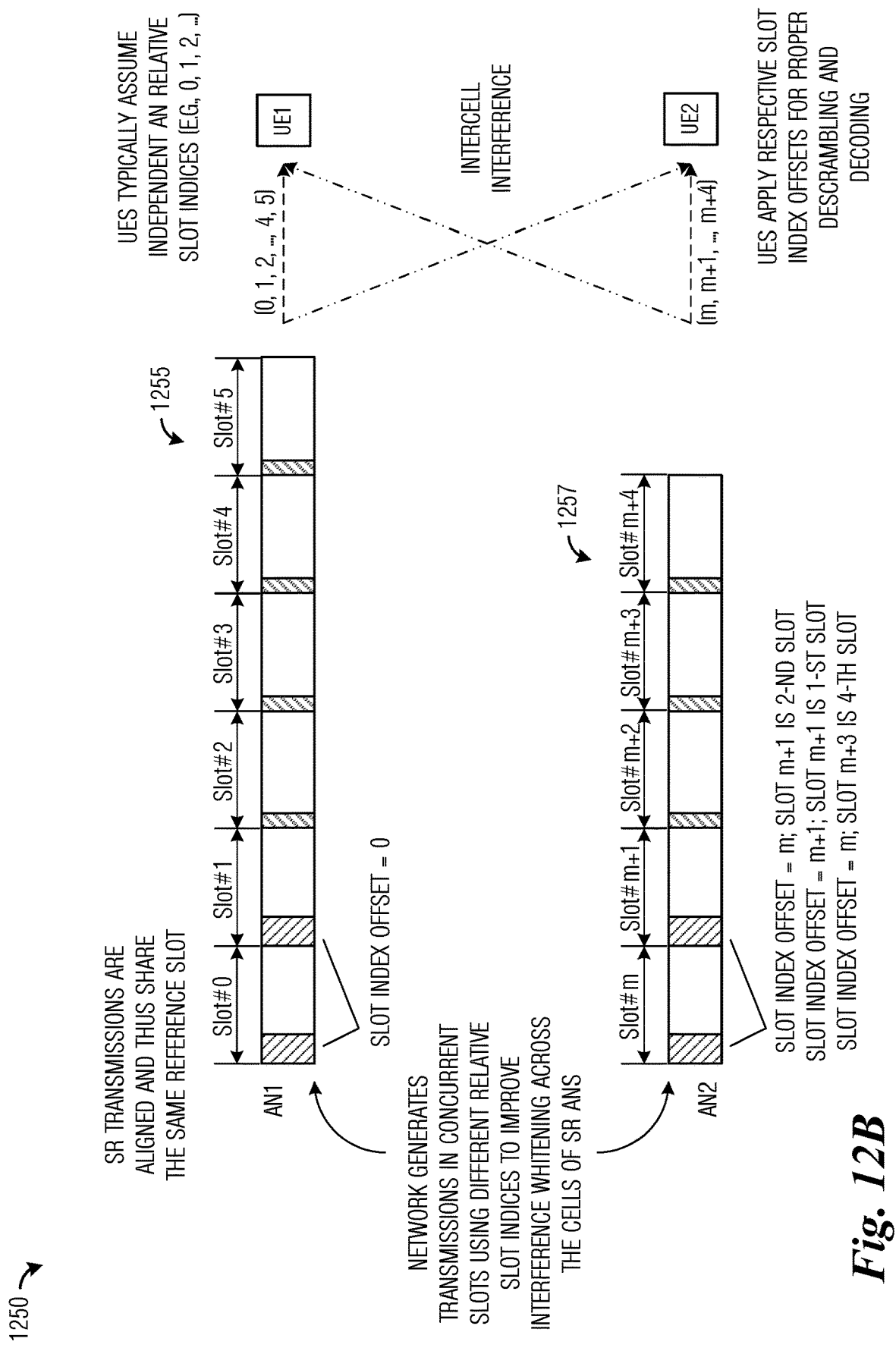
FIG. 12B illustrates example COTs transmitted by SR access nodes, highlighting the application of slot index offsets to relative slot indices in order to align bursts according to example embodiments described herein.

FIG. 12B illustrates example COTs transmitted by SR access nodes, highlighting the application of slot index offsets to relative slot indices in order to align bursts. As shown in FIG. 12B, a first COT 1255 is transmitted by a first SR access node and a second COT 1257 is transmitted by a second SR access node. For discussion purposes, consider a situation where the network sets the relative slot index of the reference slot of COT 1257 to 5 and thus the relative slot index of the second slot (Slot # m+1) is equal to 6. Then, even if the relative slot index in the initial block indicates a value of 6, a UE receiving second COT 1257 does not know whether Slot #6 is the second slot of second COT 1257 and that the slot index is relative to the missed reference slot (Slot $\#_5$), or Slot #6 is the first slot (the reference slot) of second COT 1257 with the slot index starting at 6. The inclusion of the slot index offset resolves the ambiguity. As an example, a slot index offset equal to 5 means that Slot #6 is the second slot of COT 1257 and that the first reference of COT 1257 was missed, whereas a slot index offset equal to 6 means that the slot is the first slot (the reference slot) of COT 1257. Furthermore, if initial blocks cab be present later in the COT, the UE may also assume that Slot #6 is the fourth slot of COT 1257 wherein the first three slots were missed including the reference slot with slot index 3. Indicating a slot index offset equal to 5 confirms the latter case.

Figure 13:
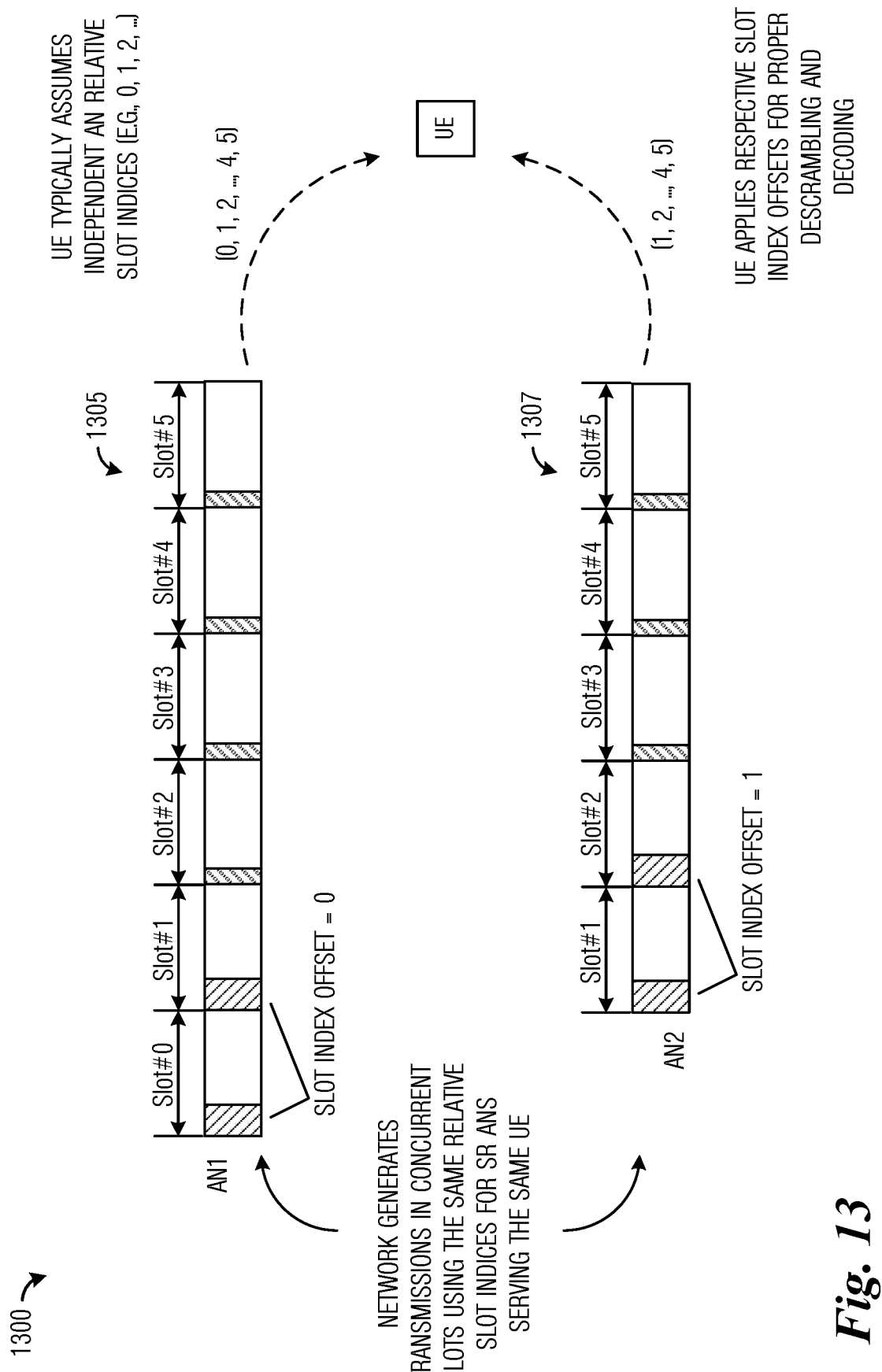
FIG. 13 illustrates example COTs transmitted by SR access nodes, highlighting the use of different slot index offsets to facilitate intra-cell SR transmissions to the same UE with unaligned transmission start according to example embodiments described herein.

FIG. 13 illustrates example COTs transmitted by SR access nodes, highlighting the use of different slot index offsets to facilitate intra-cell SR transmissions to the same UE with unaligned transmission start. When SR transmissions are not aligned at the start point, they do not share the same reference slot. Therefore, different relative slot indices would be normally used to generate the concurrent transmissions across the different cells of the SR access nodes. In some implementations, however, a UE may be served by more than one access node utilizing SR in the unlicensed channel. As shown in FIG. 13, a first COT 1305 is transmitted by a first SR access node (AN1) and a second COT 1307 is transmitted by a second SR access node (AN2). The first access node and the second access node are of a single cell and are serving a UE. The access nodes in such case may need to generate concurrent SR transmissions using the same relative slot indices so that the same scrambling or hopping sequences are used in the concurrent slots of the COTs. As an example, the slot index offset for second COT 1307 is one (instead of zero) to match the relative slot index of the same slot of first COT 1305.

Because, as discussed previously, UEs are generally configured to assume that signals and channels are prepared based on independent channel access in which each access node starts transmission with a default reference slot index, the network can use the downlink control field of the initial block to include a Slot Index Offset that the UEs apply to the relative slot indices for descrambling and decoding of intra-cell SR transmissions. As shown in FIG. 13, the downlink control field of the initial blocks of second SR access node includes a Slot Index Offset value of one.

In some implementations, control overhead savings may be achieved if the access node does not need to dynamically signal the Slot Index Offsets to the respective UEs. Instead, the UEs can be pre-configured with the respective Slot Index Offsets (in a semi-static manner) for example, using higher-layer signaling, such as radio resource control (RRC) signaling.

When some SR access nodes share the MCOT of one of them, the initial blocks may include information of the MCOT so that the transmission can end at the end point of the shared MCOT.

According to an example embodiment, in order to enable inter-cell detection of COTs, initial blocks also include a PSS. In some situations, it is beneficial to enable detection of COTs transmitted by an access node of a cell by UEs or access nodes of other cells. Such a feature can lead to improved coexistence and spatial reuse. However, the initial blocks without the PSS may enable only intra-cell detection (i.e., detection by UEs or access nodes of the same cell). The inclusion of the PSS in the initial blocks allows UEs or access nodes of other cells to attain full time synchronization. However, the design of the initial block should be unified, at least within the same network.

The presence of both the PSS and the SSS in the initial block may lead to synchronization signal block (SSB) false detection by initial access UEs because SSBs also include both PSS and SSS. In order to avoid SSB false detection, one or more of the following may be used:

- Reverse the order of multiplexing PSS and SSS used in SSBs for the initial block. Reversing the multiplexing order prevents UEs from potentially being able to distinguish the signals prior to fully receiving the signals, requiring the UEs to store the signals before being able to distinguish them.
- Use FDM to multiplex the PSS and SSS on the same unlicensed channel. A detecting access node or UE may need to store the signals before the signals can be distinguished.
- Force the initial blocks to occupy frequency resources that are shifted from those configured for SSB transmission.

The inclusion of the PSS allows for inter-cell time synchronization, allows NR-U to benefit from improved intra- or inter-operator coexistence and spatial reuse, and avoids performance degradation and failure or latency of initial access by avoiding false detection of the initial blocks as SSBs by UEs performing initial access.

Figure 14:
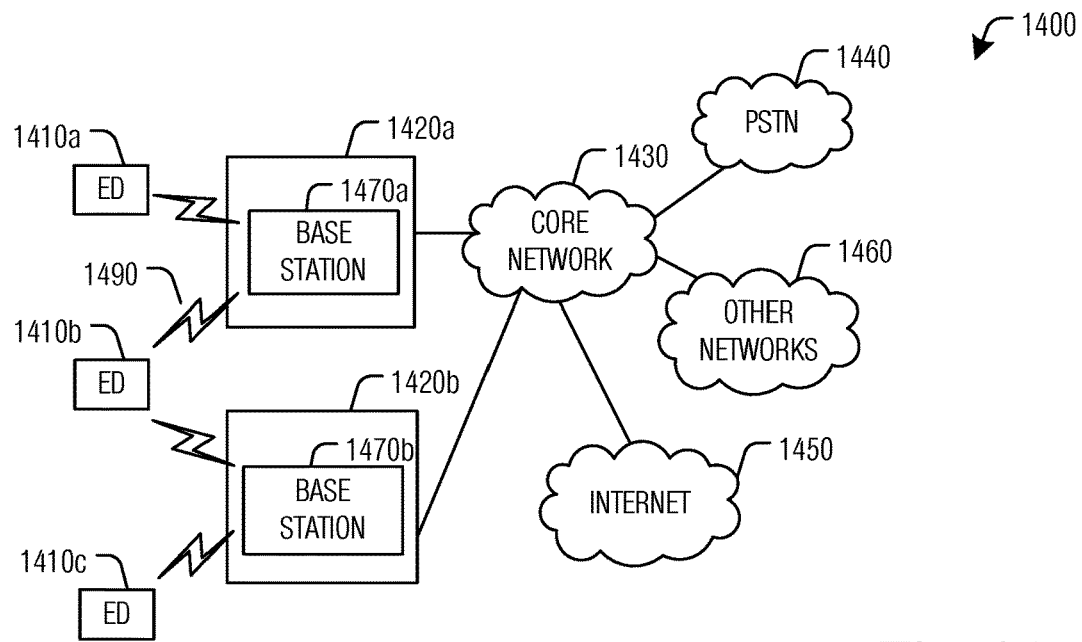
FIG. 14 illustrates an example communication system according to example embodiments described herein.

FIG. 14 illustrates an example communication system 1400. In general, the system 1400 enables multiple wireless or wired users to transmit and receive data and other content. The system 1400 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NoMA).

In this example, the communication system 1400 includes electronic devices (ED) 1410a-1410c, radio access networks (RANs) 1420a-1420b, a core network 1430, a public switched telephone network (PSTN) 1440, the Internet 1450, and other networks 1460. Although certain numbers of these components or elements are shown in FIG. 14, any number of these components or elements may be included in the system 1400.

The EDs 1410a-1410c are configured to operate or communicate in the system 1400. For example, the EDs 1410a-1410c are configured to transmit or receive via wireless or wired communication channels. Each ED 1410a-1410c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad computer or device, wireless sensor, or consumer electronics device.

The RANs 1420a-1420b here include base stations 1470a-1470b, respectively. Each base station 1470a-1470b is configured to wirelessly interface with one or more of the EDs 1410a-1410c to enable access to the core network 1430, the PSTN 1440, the Internet 1450, or the other networks 1460. For example, the base stations 1470a-1470b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 1410a-1410c are configured to interface and communicate with the Internet 1450 and may access the core network 1430, the PSTN 1440, or the other networks 1460.

In the embodiment shown in FIG. 14, the base station 1470a forms part of the RAN 1420a, which may include other base stations, elements, or devices. Also, the base station 1470b forms part of the RAN 1420b, which may include other base stations, elements, or devices. Each base station 1470a-1470b operates to transmit or receive wireless signals within a particular geographic region or area, sometimes referred to as a "cell." In some embodiments, multiple-input multiple-output (MIMO) technology may be employed having multiple transceivers for each cell.

The base stations 1470a-1470b communicate with one or more of the EDs 1410a-1410c over one or more air interfaces 1490 using wireless communication links. The air interfaces 1490 may utilize any suitable radio access technology.

It is contemplated that the system 1400 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 1420a-1420b are in communication with the core network 1430 to provide the EDs 1410a-1410c with voice, data, application, Voice over Internet Protocol (VoIP), or other services. Understandably, the RANs 1420a-1420b or the core network 1430 may be in direct or indirect communication with one or more other RANs (not shown). The core network 1430 may also serve as a gateway access for other networks (such as the PSTN 144o, the Internet 1450, and the other networks 1460). In addition, some or all of the EDs 1410a-1410c may include functionality for communicating with different wireless networks over different wireless links using different wireless technologies or protocols. Instead of wireless communication (or in addition thereto), the EDs may communicate via wired communication channels to a service provider or switch (not shown), and to the Internet 1450.

Although FIG. 14 illustrates one example of a communication system, various changes may be made to FIG. 14. For example, the communication system 1400 could include any number of EDs, base stations, networks, or other components in any suitable configuration.

Figure 15A:
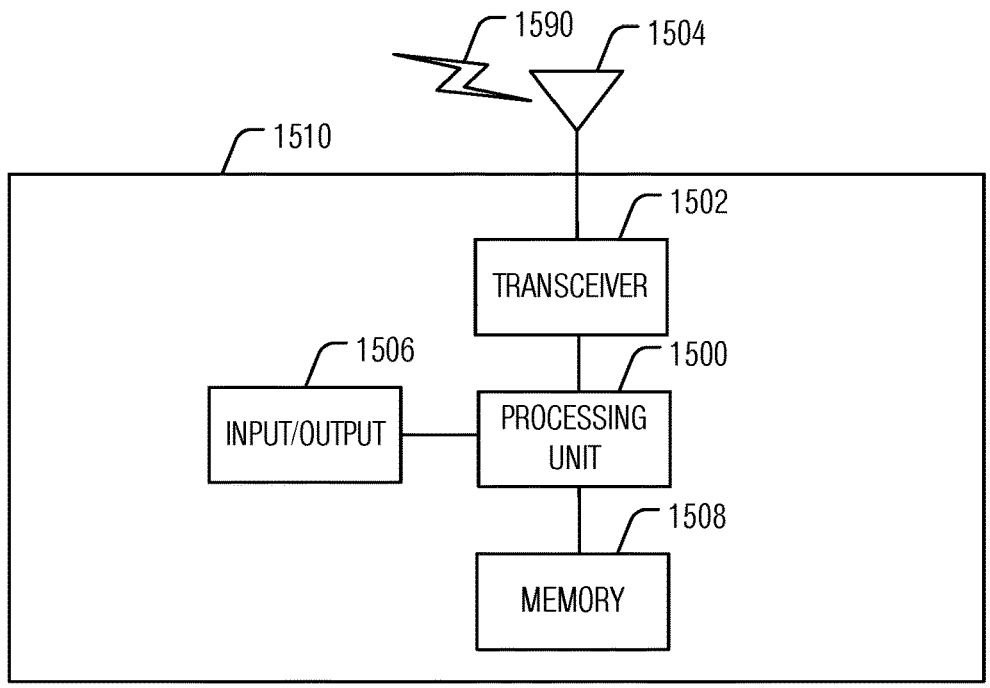
FIGS. 15A and 15B illustrate example devices that may implement the methods and teachings according to this disclosure according to example embodiments described herein.
Figure 15B:
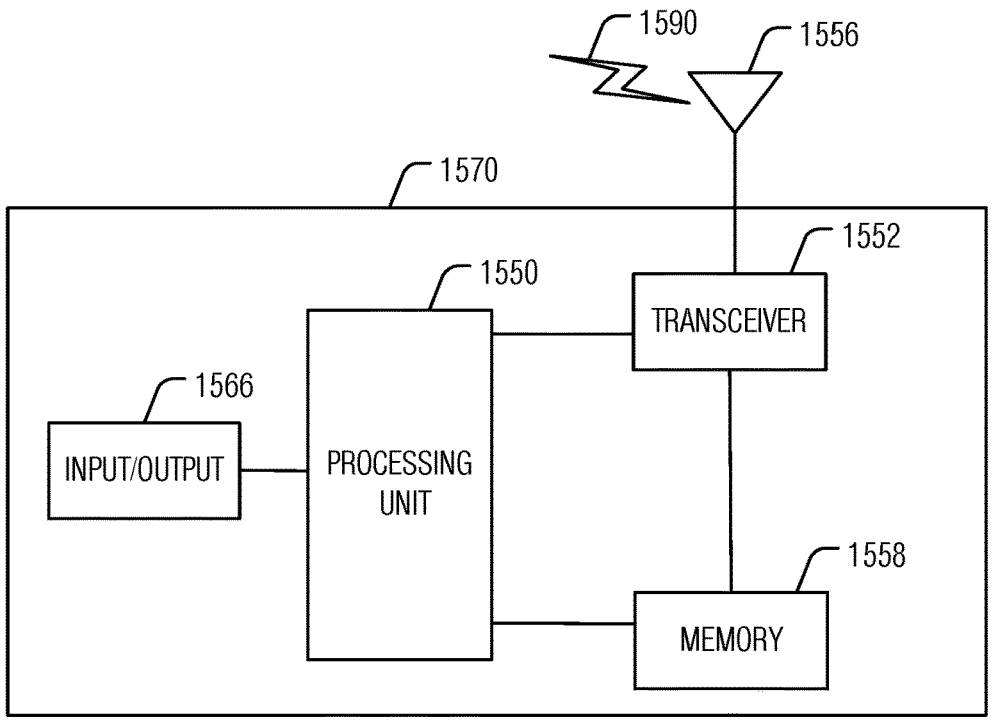

FIGS. 15A and 15B illustrate example devices that may implement the methods and teachings according to this disclosure. In particular, FIG. 15A illustrates an example ED 1510, and FIG. 15B illustrates an example base station 1570. These components could be used in the system 1400 or in any other suitable system.

As shown in FIG. 15A, the ED 1510 includes at least one processing unit 1500. The processing unit 1500 implements various processing operations of the ED 1510. For example, the processing unit 1500 could perform signal coding, data processing, power control, input/output processing, or any other functionality enabling the ED 1510 to operate in the system 1400. The processing unit 1500 also supports the methods and teachings described in more detail above. Each processing unit 1500 includes any suitable processing or computing device configured to perform one or more operations. Each processing unit 1500 could, for example, include a microprocessor, microcontroller, digital signal processor, field programmable gate array, or application specific integrated circuit.

The ED 1510 also includes at least one transceiver 1502. The transceiver 1502 is configured to modulate data or other content for transmission by at least one antenna or NIC (Network Interface Controller) 1504. The transceiver 1502 is also configured to demodulate data or other content received by the at least one antenna 1504. Each transceiver 1502 includes any suitable structure for generating signals for wireless or wired transmission or processing signals received wirelessly or by wire. Each antenna 1504 includes any suitable structure for transmitting or receiving wireless or wired signals. One or multiple transceivers 1502 could be used in the ED 1510, and one or multiple antennas 1504 could be used in the ED 1510. Although shown as a single functional unit, a transceiver 1502 could also be implemented using at least one transmitter and at least one separate receiver.

The ED 1510 further includes one or more input/output devices 1506 or interfaces (such as a wired interface to the Internet 1450). The input/output devices 1506 facilitate interaction with a user or other devices (network communications) in the network. Each input/output device 1506 includes any suitable structure for providing information to or receiving information from a user, such as a speaker, microphone, keypad, keyboard, display, or touch screen, including network interface communications.

In addition, the ED 1510 includes at least one memory 1508. The memory 1508 stores instructions and data used, generated, or collected by the ED 1510. For example, the memory 1508 could store software or firmware instructions executed by the processing unit(s) 1500 and data used to reduce or eliminate interference in incoming signals. Each memory 1508 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 15B, the base station 1570 includes at least one processing unit 1550, at least one transceiver 1552, which includes functionality for a transmitter and a receiver, one or more antennas 1556, at least one memory 1558, and one or more input/output devices or interfaces 1566. A scheduler, which would be understood by one skilled in the art, is coupled to the processing unit 1550. The scheduler could be included within or operated separately from the base station 1570. The processing unit 1550 implements various processing operations of the base station 1570, such as signal coding, data processing, power control, input/output processing, or any other functionality. The processing unit 1550 can also support the methods and teachings described in more detail above. Each processing unit 1550 includes any suitable processing or computing device configured to perform one or more operations. Each processing unit 1550 could, for example, include a microprocessor, microcontroller, digital signal processor, field programmable gate array, or application specific integrated circuit.

Each transceiver 1552 includes any suitable structure for generating signals for wireless or wired transmission to one or more EDs or other devices. Each transceiver 1552 further includes any suitable structure for processing signals received wirelessly or by wire from one or more EDs or other devices. Although shown combined as a transceiver 1552, a transmitter and a receiver could be separate components. Each antenna 1556 includes any suitable structure for transmitting or receiving wireless or wired signals. Although a common antenna 1556 is shown here as being coupled to the transceiver 1552, one or more antennas 1556 could be coupled to the transceiver(s) 1552, allowing separate antennas 1556 to be coupled to the transmitter and the receiver if equipped as separate components. Each memory 1558 includes any suitable volatile or non-volatile storage and retrieval device(s). Each input/output device 1566 facilitates interaction with a user or other devices (network communications) in the network. Each input/output device 1566 includes any suitable structure for providing information to or receiving/providing information from a user, including network interface communications.

Figure 16:
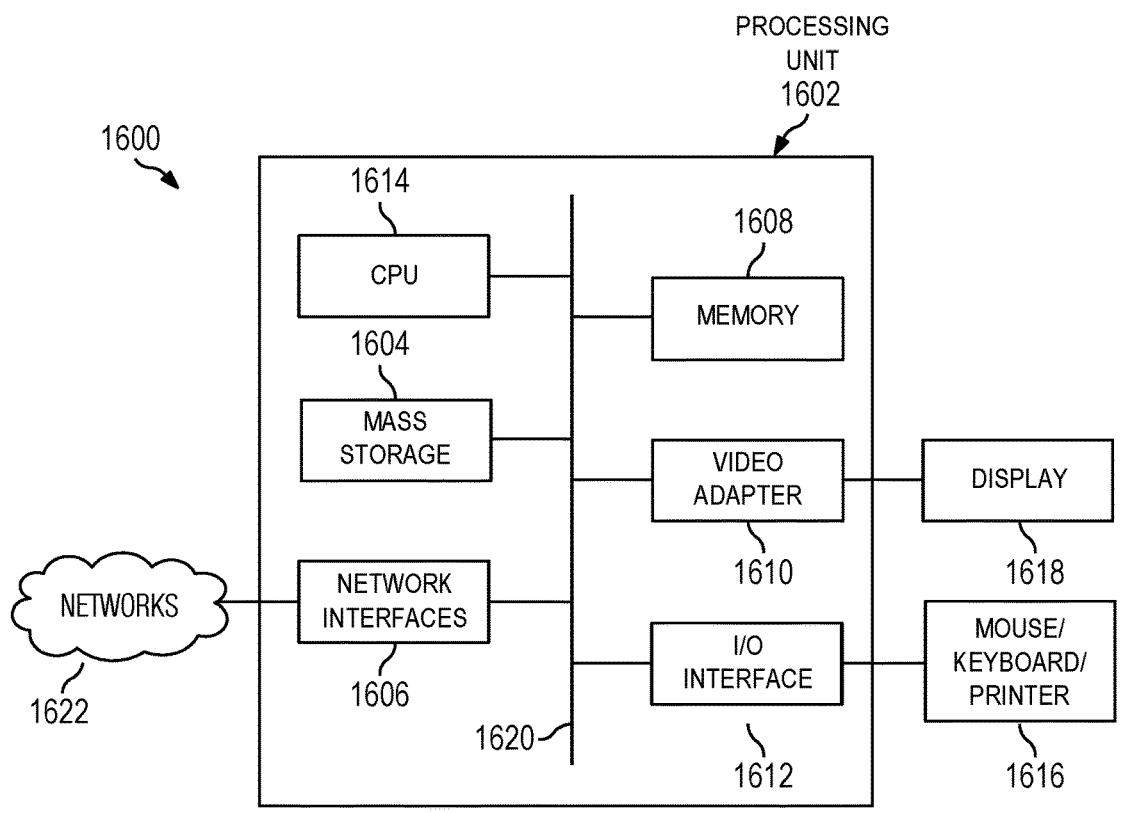
FIG. 16 is a block diagram of a computing system that may be used for implementing the devices and methods disclosed herein.

FIG. 16 is a block diagram of a computing system 1600 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1600 includes a processing unit 1602. The processing unit includes a central processing unit (CPU) 1614, memory 1608, and may further include a mass storage device 1604, a video adapter 1610, and an I/O interface 1612 connected to a bus 1620.

The bus 1620 may be one or more of any type of several bus architectures including a memory bus or memory controller, a peripheral bus, or a video bus. The CPU 1614 may comprise any type of electronic data processor. The memory 1608 may comprise any type of non-transitory system memory such as static random access memory (SRAM), dynamic random access memory (DRAM), synchronous DRAM (SDRAM), read-only memory (ROM), or a combination thereof. In an embodiment, the memory 1608 may include ROM for use at boot-up, and DRAM for program and data storage for use while executing programs.

The mass storage 1604 may comprise any type of non-transitory storage device configured to store data, programs, and other information and to make the data, programs, and other information accessible via the bus 1620. The mass storage 1604 may comprise, for example, one or more of a solid state drive, hard disk drive, a magnetic disk drive, or an optical disk drive.

The video adapter 1610 and the I/O interface 1612 provide interfaces to couple external input and output devices to the processing unit 1602. As illustrated, examples of input and output devices include a display 1618 coupled to the video adapter 1610 and a mouse, keyboard, or printer 1616 coupled to the I/O interface 1612. Other devices may be coupled to the processing unit 1602, and additional or fewer interface cards may be utilized. For example, a serial interface such as Universal Serial Bus (USB) (not shown) may be used to provide an interface for an external device.

The processing unit 1602 also includes one or more network interfaces 1606, which may comprise wired links, such as an Ethernet cable, or wireless links to access nodes or different networks. The network interfaces 1606 allow the processing unit 1602 to communicate with remote units via the networks. For example, the network interfaces 1606 may provide wireless communication via one or more transmitters/transmit antennas and one or more receivers/receive antennas. In an embodiment, the processing unit 1602 is coupled to a local-area network 1622 or a wide-area network for data processing and communications with remote devices, such as other processing units, the Internet, or remote storage facilities.

Figure 17:
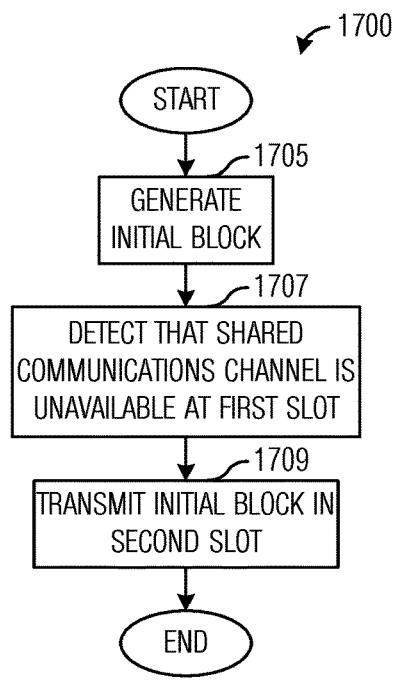
FIG. 17 illustrates a flow diagram of example operations 1700 occurring in an access node performing a transmission that involves a LBT failure according to example embodiments described herein.

FIG. 17 illustrates a flow diagram of example operations 1700 occurring in an access node performing a transmission that involves a LBT failure. Operations 170o may be indicative of operations occurring in an access node as the access node performs a transmission that involves a LBT failure.

Operations 1700 begin with the access node generating an initial block (block 1705). The initial block includes a time-independent initial sequence. The access node performs a LBT procedure and determines that the shared communications channel is unavailable during a first slot (block 1707). The access node waits and tries the LBT procedure again during a second slot and determines that the shared communications channel is available during a second slot and transmits the initial block (block 1709). The access node did not have to regenerate the initial block due to the initial block including the time-independent initial sequence.

The following examples may assist in understanding the present disclosure:

Example 1

A computer-implemented method for operating an access node, the method comprising: generating, by the access node, an initial block and a time-dependent signal for transmission in a channel occupancy time (COT) of a shared communications channel, the initial block including a time-independent initial sequence that enables the initial block to be transmitted over any slot in the COT, wherein the time-dependent signal is transmitted after the initial block; and transmitting, by the access node, the initial block and the time-dependent signal in the COT.

Example 2

The method of Example 1, wherein the initial block identifies the slot within which it is transmitted as a reference slot.

Example 3

The method of Example 2, wherein the time-dependent signal is time-dependent relative to a time of the reference slot.

Example 4

The method of Example 1, wherein the initial block further comprises control information configuring the COT.

Example 5

The method of Example 4, wherein the control information comprises at least one of an indicator of a duration of the COT, or an indicator of a composition of the COT.

Example 6

The method of Example 5, wherein the indicator of the composition of the COT comprises a transmission type for each slot of the COT.

Example 7

The method of Example 4, wherein the relative slot index of the slot where the initial block located is carried in the control information field of the initial block.

Example 8

The method of Example 7, further comprising adjusting, by the access node, the relative slot index of the slot with a slot offset associated with the COT.

Example 9

The method of Example 1, wherein the time-independent initial sequence comprises a secondary synchronization signal (SSS) or a demodulation reference signal (DMRS) for a control information.

Example 10

The method of Example 9, wherein the control information is carried in a physical layer channel with a structure of a physical broadcast channel (PBCH), or in a physical downlink control channel (PDCCH) with a structure of control resource set (CORESET).

Example 11

The method of Example 9, wherein the time-independent initial sequence further comprises a primary synchronization signal (PSS).

Example 12

The method of Example 1, wherein there is a plurality of initial blocks, wherein the shared communications channel comprises a plurality of carriers, and wherein at least one initial block of the plurality of initial blocks is transmitted in a subset of carriers of the plurality of carriers.

Example 13

The method of Example 12, wherein the initial blocks transmitted in the subset of carriers during a slot are different.

Example 14

The method of Example 12, wherein the initial blocks transmitted in the subset of carriers during a slot are duplicates.

Example 15

The method of Example 1, wherein there is a plurality of initial blocks transmitted in the COT, wherein a first subset of the plurality of initial blocks are transmitted in a first subset of slots of the COT, and a second subset of the plurality of initial blocks are transmitted in a second subset of the slots of the COT.

Example 16

The method of Example 15, wherein each ones of the first subset of the plurality of initial blocks comprise a time-independent initial sequence, and each ones of the second subset of the plurality of initial blocks comprise a time-independent initial sequence and control information configuring the COT.

Example 17

The method of Example 1, wherein the time-independent initial sequence of the initial block comprises a plurality of duplicates of a SSS or a DMRS PBCH.

Example 18

The method of Example 1, further comprising transmitting, by the access node, a transmission in a slot during a downlink portion of the COT, wherein the transmission is scrambled in accordance with a relative slot index of the slot.

Example 19

A computer-implemented method for operating a user equipment (UE), the method comprising:
detecting, by the UE on a shared communications channel, an initial block and a time-dependent signal, where the initial block includes a time-independent initial sequence, and wherein the time-dependent signal is detected after the initial block is detected; and
identifying, by the UE, a slot of a channel occupancy time (COT) of the shared communications channel wherein the initial block was detected as a reference slot.

Example 20

The method of Example 19, further comprising receiving, by the UE, a transmission in a slot during a downlink portion of the COT, wherein the transmission is scrambled in accordance with the reference slot and a relative slot index of the slot.

Example 21

The method of Example 19, wherein the initial block further comprises control information configuring the COT.

Example 22

The method of Example 21, wherein the control information comprises at least one of an indicator of a duration of the COT, or an indicator of a composition of the COT.

Example 23

The method of Example 21, wherein the relative slot index of the slot where the initial block located is carried in the control information field of the initial block.
Example 24. The method of Example 23, further comprising adjusting, by the UE, the relative slot index of the reference slot with a slot offset associated with the COT.

Example 25

The method of Example 19, wherein the time-independent initial sequence comprises a secondary synchronization signal (SSS) or a demodulation reference signal (DMRS) for a control information.

Example 26

The method of Example 25, wherein the control information is carried in a physical layer channel with a structure of a physical broadcast channel (PBCH), or in a physical downlink control channel (PDCCH) with a structure of control resource set (CORESET).

Example 27

The method of Example 25, wherein the time-independent initial sequence further comprises a primary synchronization signal (PSS).

Example 28

The method of Example 19, wherein there is a plurality of initial blocks, wherein the shared communications channel comprises a plurality of carriers, and wherein at least one initial block of the plurality of initial blocks is transmitted in a subset of carriers of the plurality of carriers.

Example 29

The method of Example 28, wherein the initial blocks received in the subset of carriers during a slot are different.

Example 30

The method of Example 28, wherein the initial blocks received in the subset of carriers during a slot are duplicates.

Example 31

The method of Example 19, wherein there is a plurality of initial blocks are detected in the COT, wherein a first subset of the plurality of initial blocks are received in a first subset of slots of the COT, and a second subset of the plurality of initial blocks are received in a second subset of the slots of the COT.

Example 32

The method of Example 31, wherein each ones of the first subset of the plurality of initial blocks comprise a time-independent initial sequence, and each ones of the second subset of the plurality of initial blocks comprise a time-independent initial sequence and control information configuring the COT.

Example 33

The method of Example 19, wherein the time-independent initial sequence of the initial block comprises a plurality of duplicates of a SSS or a DMRS PBCH.

Example 34

The method of Example 19, further comprising receiving, by the UE, a transmission in a slot during a downlink portion of the COT, wherein the transmission is scrambled in accordance with a relative slot index of the slot.

Example 35

A computer-implemented method for operating an access node, the method comprising:
generating, by the access node, an initial block for a channel occupancy time (COT) of a shared communications channel, the initial block comprising a time-independent initial sequence;

determining, by the access node, that the shared communications channel is unavailable at a first slot; and transmitting, by the access node, the initial block for the COT in a second slot without regenerating the initial block.

Example 36

The method of Example 35, wherein the initial block further comprises control information configuring the COT.

Example 37

The method of Example 36, wherein the time-independent initial sequence of the initial block is scrambled with a scrambling sequence initialized with a relative slot index of a slot where the initial block is transmitted.

Example 38

The method of Example 37, further comprising adjusting, by the access node, the relative slot index of the second slot with a slot offset associated with the COT.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a generating unit or module, or an adjusting unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the scope of the disclosure as defined by the appended claims.

What is claimed is:

1. A computer-implemented method for operating an access node, the method comprising:
generating, by the access node, an initial block and a time-dependent signal for transmission in a channel occupancy time (COT) of a shared communications channel, the initial block including a time-independent initial sequence such that the initial block is independent of system timing, the time-independent initial sequence enabling the initial block to be transmitted over any slot in the COT, wherein the time-dependent signal is transmitted after the initial block; and
transmitting, by the access node, the initial block and the time-dependent signal in a first slot of the COT.

2. The method of claim 1, wherein the time-independent initial sequence comprises a demodulation reference signal (DMRS) for control information.

3. The method of claim 2, wherein the DMRS for control information is transmitted over a physical broadcast channel (PBCH).

4. The method of claim 2, wherein the DMRS for control information is transmitted over a physical downlink control channel (PDCCH) having a structure of control resource set (CORESET).

5. The method of claim 4, wherein the DMRS for control information is a DMRS for one or more physical downlink control channels (PDCCHs) in the CORESET at a beginning of the COT.

6. The method of claim 5, wherein the one or more PDCCHs are group common (GC)-PDCCH in a common search space at a beginning of the COT.

7. The method of claim 6, wherein the GC-PDCCH carries a COT structure indication in one or more of a time domain and a frequency domain.

8. The method of claim 1, wherein the initial block is transmitted at the beginning of each of a plurality of downlink (DL) bursts within the COT.

9. The method of claim 1, wherein the initial block identifies the slot within which it is transmitted as a reference slot.

10. The method of claim 9, wherein the time-dependent signal is time-dependent relative to a time of the reference slot.

11. The method of claim 1, wherein the initial block further comprises control information configuring the COT.

12. The method of claim ii, wherein the control information comprises at least one of an indicator of a duration of the COT, or an indicator of a composition of the COT.

13. The method of claim 12, wherein the indicator of the composition of the COT comprises a transmission type for each slot of the COT.

14. The method of claim 11, wherein a relative slot index of the slot where the initial block located is carried in a control information field of the initial block.

15. The method of claim 14, further comprising adjusting, by the access node, the relative slot index of the slot with a slot offset associated with the COT.

16. The method of claim 1, wherein the shared communications channel comprises a plurality of listen before talk (LBT) subbands, and wherein at least one initial block is transmitted in a subset of LBT subbands of the plurality of LBT subbands.

17. The method of claim 16, wherein transmitting the initial block comprises transmitting the at least one initial block over each subband of the plurality of subbands in which an LBT process is successfully performed.

18. The method of claim 16, wherein different initial blocks are transmitted over each carrier of a subset of carriers during a common slot.

19. The method of claim 16, wherein the same initial block is transmitted over each carrier of a subset of carriers during a common slot.

20. The method of claim 1, further comprising:
generating, by the access node, a second initial block comprising a time-dependent initial sequence and control information configuring the COT; and
transmitting the second initial block in at least one second slot of the COT, the at least one second slot of the COT being later than the first slot of the COT.

21. The method of claim 1, wherein the time-independent initial sequence of the initial block comprises a plurality of duplicates of a PBCH DMRS.

22. The method of claim 1, further comprising transmitting, by the access node, a transmission in a slot during a downlink portion of the COT, the transmission being scrambled in accordance with a relative slot index of the slot.

23. An access node for use in a wireless network, comprising:
a transmitter;
a processor; and a non-transitory computer-readable medium containing instructions which, when executed by the processor, cause the access node to:
generate an initial block and a time-dependent signal for transmission in a channel occupancy time (COT) of a shared communications channel, the initial block including a time-independent initial sequence such that the initial block is independent of system timing, the time-independent initial sequence enabling the initial block to be transmitted over any slot in the COT, wherein the time-dependent signal is transmitted after the initial block; and
transmit the initial block and the time-dependent signal in a first slot of the COT.

24. The access node of claim 23, wherein the time-independent initial sequence comprises a demodulation reference signal (DMRS) for control information.

25. The access node of claim 24, wherein the DMRS for control information is transmitted over a physical broadcast channel (PBCH).

26. The access node of claim 24, wherein the DMRS for control information is transmitted over a physical downlink control channel (PDCCH) having a structure of control resource set (CORESET).

27. The access node of claim 26, wherein the DMRS for control information is a DMRS for one or more physical downlink control channels (PDCCHs) in the CORESET at a beginning of the COT.

28. The access node of claim 27, wherein the one or more PDCCHs are group common (GC)-PDCCH in a common search space at a beginning of the COT.

29. The access node of claim 28, wherein the GC-PDCCH carries a COT structure indication in one or more of a time domain and a frequency domain.

30. The access node of claim 23, wherein the initial block is transmitted at the beginning of each of a plurality of downlink (DL) bursts within the COT.

31. The access node of claim 23, wherein the initial block identifies the slot within which it is transmitted as a reference slot.

32. The access node of claim 31, wherein the time-dependent signal is time-dependent relative to a time of the reference slot.

33. The access node of claim 23, wherein the initial block further comprises control information configuring the COT.

34. The access node of claim 33, wherein the control information comprises at least one of an indicator of a duration of the COT, or an indicator of a composition of the COT.

35. The access node of claim 34, wherein the indicator of the composition of the COT comprises a transmission type for each slot of the COT.

36. The access node of claim 33, wherein a relative slot index of the slot where the initial block located is carried in a control information field of the initial block.

37. The access node of claim 36, the instructions further causing the access node to adjust the relative slot index of the slot with a slot offset associated with the COT.

38. The access node of claim 23, wherein the shared communications channel comprises a plurality of listen before talk (LBT) subbands, and wherein at least one initial block is transmitted in a subset of LBT subbands of the plurality of LBT subbands.

39. The access node of claim 38, wherein different initial blocks are transmitted over each carrier of a subset of carriers during a common slot.

40. The access node of claim 38, wherein the same initial block is transmitted over each carrier of a subset of carriers during a common slot.

41. The access node of claim 23, the instructions further causing the access node to:
generate a second initial block comprising a time-dependent initial sequence and control information configuring the COT; and
transmit the second initial block in at least one second slot of the COT, the at least one second slot of the COT being later than the first slot of the COT.

42. The access node of claim 23, wherein the time-independent initial sequence of the initial block comprises a plurality of duplicates of a PBCH DMRS.

43. The access node of claim 23, the instructions further causing the access node to transmit a transmission in a slot during a downlink portion of the COT, the transmission being scrambled in accordance with a relative slot index of the slot.

* * * * *